United States Patent
Yamada et al.

(10) Patent No.: US 9,373,356 B2
(45) Date of Patent: Jun. 21, 2016

(54) MAGNETIC RECORDING AND REPRODUCING DEVICE AND MAGNETIC RECORDING AND REPRODUCING METHOD

(71) Applicant: KABUSHIKI KAISHA TOSHIBA, Tokyo (JP)

(72) Inventors: Kenichiro Yamada, Tokyo (JP); Masayuki Takagishi, Tokyo (JP); Tomoyuki Maeda, Kanagawa (JP); Yousuke Isowaki, Kanagawa (JP); Naoyuki Narita, Kanagawa (JP); Shuichi Murakami, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/887,998

(22) Filed: Oct. 20, 2015

(65) Prior Publication Data
US 2016/0133293 A1     May 12, 2016

(30) Foreign Application Priority Data
Nov. 10, 2014    (JP) ................................ 2014-228340

(51) Int. Cl.
| | |
|---|---|
| *G11B 5/86* | (2006.01) |
| *G11B 5/02* | (2006.01) |
| *G11B 20/12* | (2006.01) |
| *G11B 5/012* | (2006.01) |

(52) U.S. Cl.
CPC ............ *G11B 20/1217* (2013.01); *G11B 5/012* (2013.01); *G11B 2020/1238* (2013.01)

(58) Field of Classification Search
CPC .. G11B 5/02; G11B 5/865; G11B 2005/0021; G11B 5/012; G11B 5/00; G11B 27/30287; G11B 5/59627; G11B 5/59655; G11B 5/59633; G11B 5/39; G11B 21/24; G11B 5/3929

USPC ......... 360/48, 59, 17, 313, 319, 235.4, 234.2, 360/324.2
See application file for complete search history.

(56) References Cited

U.S. PATENT DOCUMENTS

| | | | | |
|---|---|---|---|---|
| 6,028,824 | A | * | 2/2000 | Osato ............... G11B 11/10519 369/13.51 |
| 7,982,994 | B1 | | 7/2011 | Erden et al. |
| 8,988,814 | B1 | | 3/2015 | Harada et al. |
| 2013/0083416 | A1 | | 4/2013 | Kasiraj et al. |

FOREIGN PATENT DOCUMENTS

| | | |
|---|---|---|
| JP | 2013-80552 | 5/2013 |
| JP | 2013-214353 | 10/2013 |

* cited by examiner

*Primary Examiner* — Nabil Hindi
(74) *Attorney, Agent, or Firm* — Finnegan, Henderson, Farabow, Garrett & Dunner, LLP

(57) ABSTRACT

According to one embodiment, a magnetic recording and reproducing device includes a magnetic recording medium, a recording unit, and a reproducing unit. The magnetic recording medium includes a first track including first and second sub-tracks extending in a first direction. The second sub-track is arranged with the first sub-track in a second direction intersecting the first direction. The recording unit records information in the first and second sub-tracks. The reproducing unit reproduces the information recorded in the first and second sub-tracks while opposing the first, second sub-tracks, and a boundary between the first and second sub-tracks. The first sub-track includes first magnetic recording components including first and second components. The second sub-track includes second magnetic recording components including third and fourth components. A first recording symbol is formed of the first and third components. A second recording symbol is formed of the second and fourth components.

20 Claims, 10 Drawing Sheets

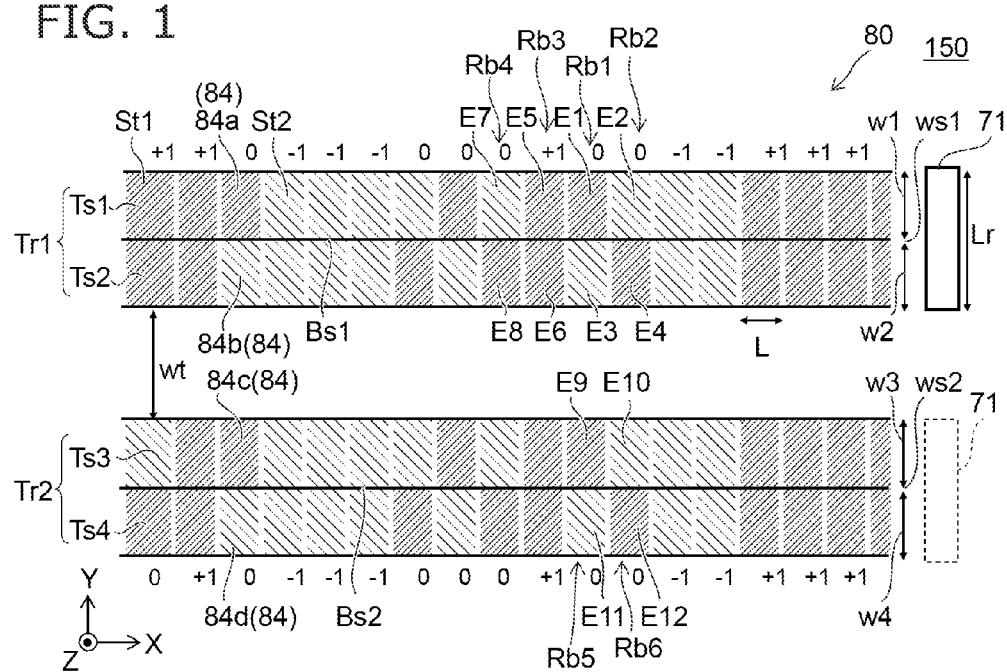
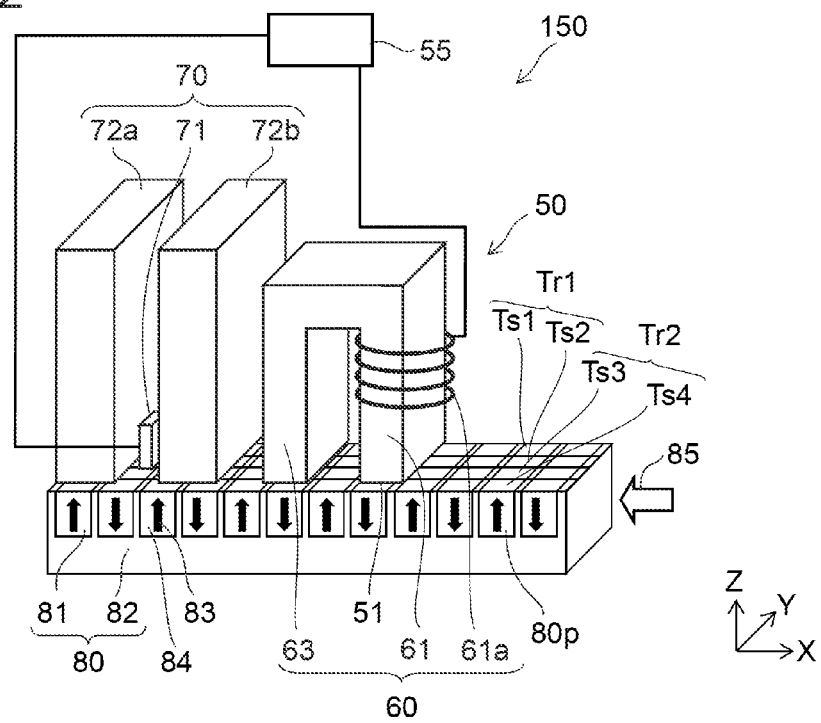

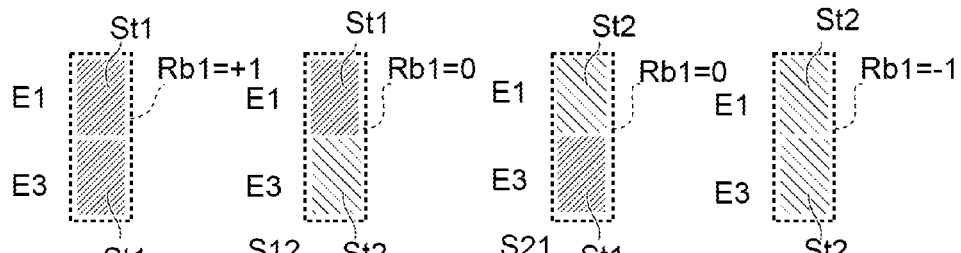
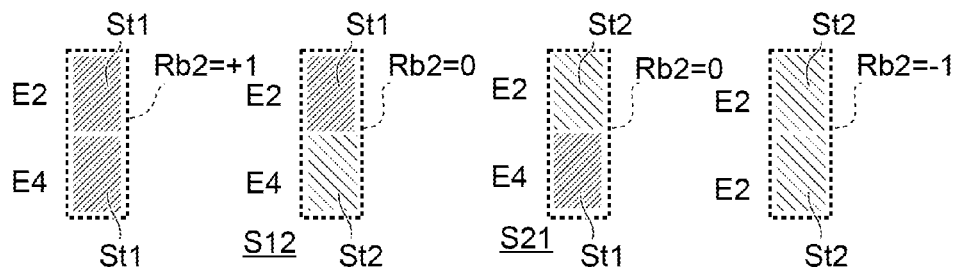
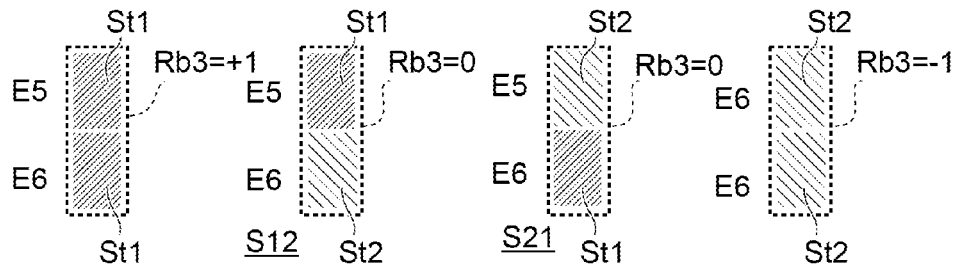
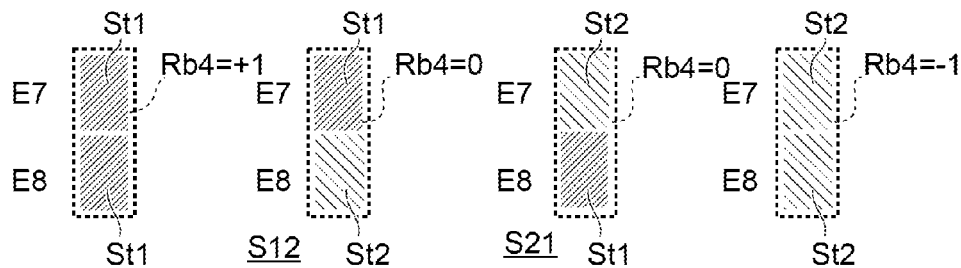

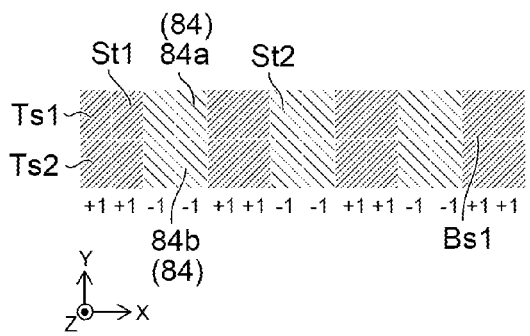 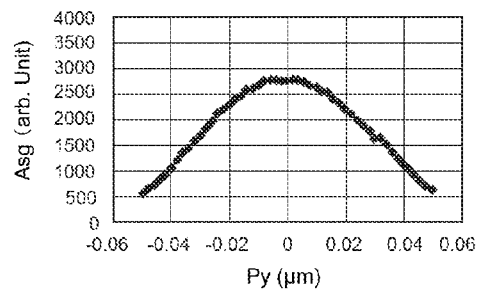
FIG. 5A                FIG. 5B
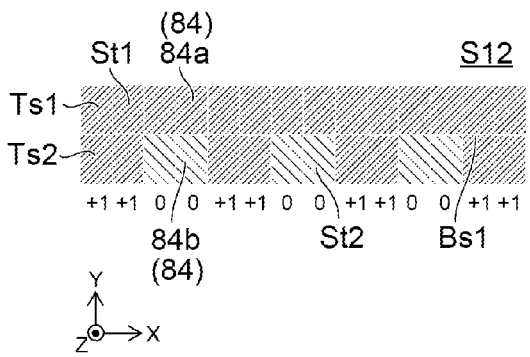 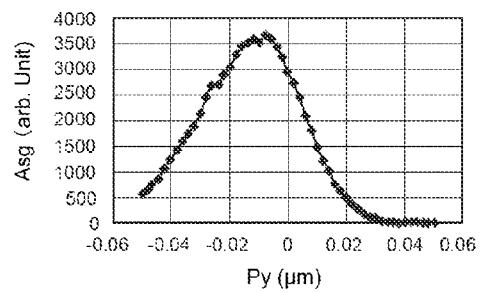
FIG. 5C                FIG. 5D
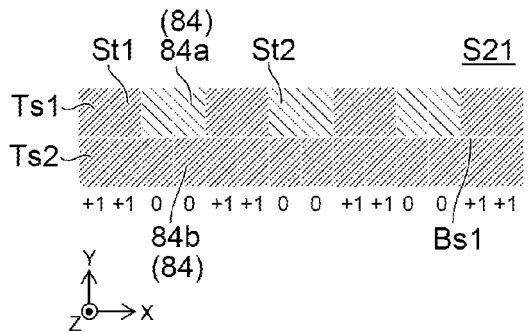 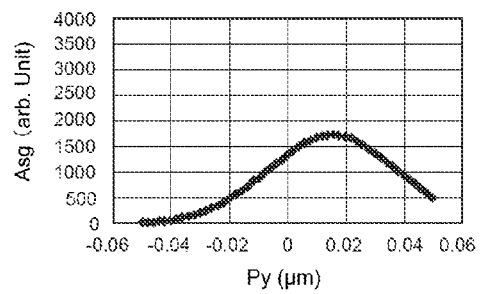
FIG. 5E                FIG. 5F

MAGNETIC RECORDING AND REPRODUCING DEVICE AND MAGNETIC RECORDING AND REPRODUCING METHOD

CROSS-REFERENCE TO RELATED APPLICATIONS

This application is based upon and claims the benefit of priority from Japanese Patent Application No. 2014-228340, filed on Nov. 10, 2014; the entire contents of which are incorporated herein by reference.

FIELD

Embodiments described herein relate generally to a magnetic recording and a reproducing device and a magnetic recording and reproducing method.

BACKGROUND

Information is recorded in a magnetic recording medium such as a HDD (Hard Disk Drive), etc., using a magnetic recording head. In a magnetic recording and reproducing device, it is desirable to implement high density recording more stably.

BRIEF DESCRIPTION OF THE DRAWINGS

FIG. 1 is a schematic plan view showing a portion of a magnetic recording and reproducing device according to a first embodiment;

FIG. 2 is a schematic perspective view showing the magnetic recording and reproducing device according to the first embodiment;

FIG. 4A to FIG. 4P are schematic plan views showing a portion of the magnetic recording and reproducing device according to the first embodiment;

FIG. 5A to FIG. 5F are schematic views showing characteristics of the magnetic recording and reproducing device;

DETAILED DESCRIPTION

Figure 3:
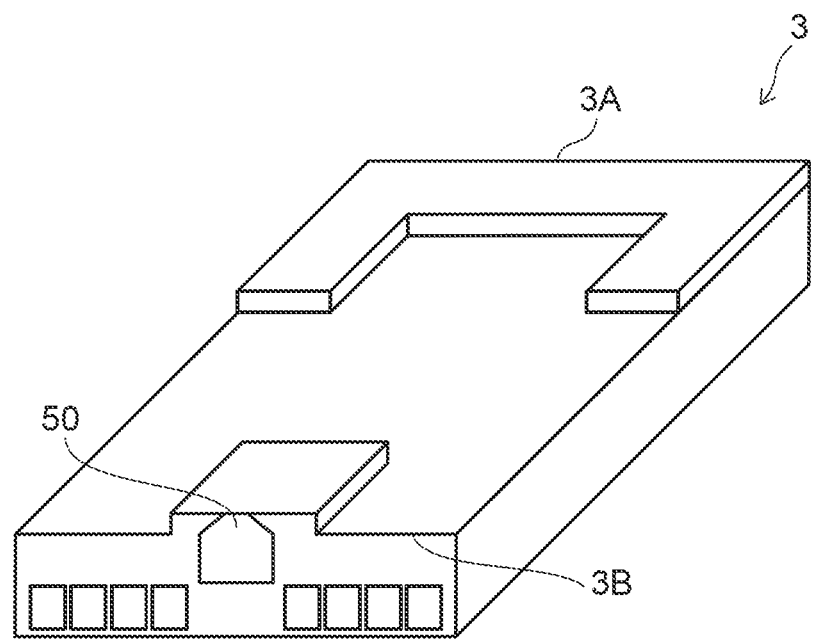
FIG. 3 is a schematic perspective view showing a portion of the magnetic recording and reproducing device according to the first embodiment.

According to one embodiment, a magnetic recording and reproducing device includes a magnetic recording medium, a recording unit, and a reproducing unit. The magnetic recording medium includes a first track. The first track includes a first sub-track extending in a first direction, and a second sub-track extending in the first direction, the second sub-track being arranged with the first sub-track in a second direction intersecting the first direction. The recording unit records information in the first sub-track and the second sub-track. The reproducing unit reproduces the information recorded in the first sub-track and the second sub-track while opposing the first sub-track, the second sub-track, and a boundary between the first sub-track and the second sub-track. The first sub-track includes a plurality of first magnetic recording components. The first magnetic recording components include a first component and a second component, the second component being adjacent to the first component in the first direction. The second sub-track includes a plurality of second magnetic recording components. The second magnetic recording components include a third component and a fourth component, the third component being adjacent to the first component in the second direction, the fourth component being adjacent to the third component in the first direction and adjacent to the second component in the second direction. A first recording symbol is formed of the first component and the third component. A second recording symbol is formed of the second component and the fourth component. The information recorded in the first recording symbol is a first value when a magnetization of the first component is in a first state and a magnetization of the third component is in the first state. The information recorded in the first recording symbol is a second value when the magnetization of the first component is in a second state and the magnetization of the third component is in the second state. The information recorded in the first recording symbol is a third value when the magnetization of the first component is in the first state and the magnetization of the third component is in the second state. The information recorded in the second recording symbol is the third value when a magnetization of the second component is in the second state and a magnetization of the fourth component is in the first state.

According to another embodiment, a magnetic recording and reproducing device includes a magnetic recording medium, a recording unit, and a reproducing unit. The magnetic recording medium includes a first track. The first track includes a first sub-track extending in a first direction, and a second sub-track extending in the first direction, the second sub-track being arranged with the first sub-track in a second direction intersecting the first direction. The recording unit records information in the first sub-track and the second sub-track. The reproducing unit reproduces the information recorded in the first sub-track and the second sub-track while opposing the first sub-track, the second sub-track, and a boundary between the first sub-track and the second sub-track. The first sub-track includes a plurality of first magnetic recording components. The second sub-track includes a plurality of second magnetic recording components. One of a plurality of recording symbols arranged in the first direction is formed of one of the first magnetic recording components and one of the second magnetic recording components. The one of the second magnetic recording components is adjacent to the one of the first magnetic recording components in the second direction. The one of the first magnetic recording components included in the one of the recording symbols has a first magnetization, and the one of the second magnetic recording components included in the one of the recording symbols has a second magnetization. The information recorded in the one of the recording symbols is a first value when the first magnetization is in a first state and the second magnetization is in the first state. The information recorded in the one of the recording symbols is a second value when the first magnetization is in a second state and the second magnetization is in the second state. The information recorded in the one of the recording symbols is a third value when the first magnetization is in the first state and the second magnetization is in the second state, or when the first magnetization is in the second state and the second magnetization is in the first state. A number of continuous magnetic recording components of the first magnetic recording components having the magnetizations in a same state is 4 or less in the first sub-track. A number of continuous magnetic recording components of the second magnetic recording components having the magnetizations in a same state is 4 or less in the second sub-track.

According to another embodiment, a magnetic recording and reproducing method is disclosed. The method can record information in a first sub-track and a second sub-track. The first sub-track and the second sub-track are included in a first track included in a magnetic recording medium. The first sub-track extends in a first direction. The second sub-track extends in the first direction and is arranged with the first sub-track in a second direction intersecting the first direction. The method can reproduce the information recorded in the first sub-track and the second sub-track. The reproducing is performed by a reproducing unit. The reproducing unit opposes the first sub-track, the second sub-track, and a boundary between the first sub-track and the second sub-track. A plurality of first magnetic recording components included in the first sub-track include a first component and a second component. The second component is adjacent to the first component in the first direction. A plurality of second magnetic recording components included in the second sub-track include a third component and a fourth component. The third component is adjacent to the first component in the second direction. The fourth component is adjacent to the third component in the first direction and adjacent to the second component in the second direction. A first recording symbol is formed of the first component and the third component. A second recording symbol is formed of the second component and the fourth component. A magnetization of the first component is set to a first state and a magnetization of the third component is set to the first state when the information recorded in the first recording symbol is a first value. The magnetization of the first component is set to a second state and the magnetization of the third component is set to the second state when the information recorded in the first recording symbol is a second value. The magnetization of the first component is set to the first state and the magnetization of the third component is set to the second state when the information recorded in the first recording symbol is a third value. A magnetization of the second component is set to the second state and a magnetization of the fourth component is set to the first state when the information recorded in the second recording symbol is the third value.

According to another embodiment, a magnetic recording and reproducing method is disclosed. The method can record information in a first sub-track and a second sub-track. The first sub-track and the second sub-track are included in a first track included in a magnetic recording medium. The first sub-track extends in a first direction. The second sub-track extends in the first direction and is arranged with the first sub-track in a second direction intersecting the first direction. The method can reproduce the information recorded in the first sub-track and the second sub-track. The reproducing is performed by a reproducing unit. The reproducing unit opposes the first sub-track, the second sub-track, and a boundary between the first sub-track and the second sub-track. The first sub-track includes a plurality of first magnetic recording components. The second sub-track includes a plurality of second magnetic recording components. One of a plurality of recording symbols arranged in the first direction is formed of one of the first magnetic recording components and one of the second magnetic recording components. The one of the second magnetic recording components is adjacent to the one of the first magnetic recording components in the second direction. The one of the first magnetic recording components included in the one of the recording symbols has a first magnetization, and the one of the second magnetic recording components included in the one of the recording symbols has a second magnetization. The first magnetization is set to a first state and the second magnetization is set to the first state when the information recorded in the one of the recording symbols is a first value. The first magnetization is set to a second state and the second magnetization is set to the second state when the information recorded in the one of the recording symbols is a second value. When the information recorded in the one of the recording symbols is a third value, the second magnetization is set to the second state while setting the first magnetization to the first state, or the second magnetization is set to the first state while setting the first magnetization to the second state. A number of continuous magnetic recording components of the first magnetic recording components having the magnetizations in a same state is 4 or less in the first sub-track. A number of continuous magnetic recording components of the second magnetic recording components having the magnetizations in a same state is 4 or less in the second sub-track.

Various embodiments will now be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic plan view illustrating a portion of a magnetic recording and reproducing device according to a first embodiment.

FIG. 2 is a schematic perspective view illustrating the magnetic recording and reproducing device according to the first embodiment.

FIG. 3 is a schematic perspective view illustrating a portion of the magnetic recording and reproducing device according to the first embodiment.

As shown in FIG. 2, the magnetic recording and reproducing device 150 according to the embodiment includes a magnetic recording medium 80, a recording unit 60, and a reproducing unit 70. The recording unit 60 and the reproducing unit 70 are included in a magnetic head 50.

The magnetic head 50 is disposed to oppose the magnetic recording medium 80 (e.g., a magnetic disk or the like). The magnetic head 50 has a medium-opposing surface 51 (Air Bearing Surface (ABS)).

The magnetic recording medium 80 includes, for example, a medium substrate 82, and a magnetic recording layer 81 that is provided on the medium substrate 82. Multiple magnetic recording components 84 are provided in the magnetic recording layer 81. Each of the multiple magnetic recording components 84 includes, for example, one or more crystal grains. Each of the multiple magnetic recording components 84 may include one or more patterned magnets. The magnetic recording medium 80 includes, for example, a granular medium. One magnetic recording component 84 includes, for example, magnetic particles of a granular medium. The magnetic recording medium 80 moves relative to the magnetic head 50 along a medium movement direction 85. The magnetic recording medium 80 has, for example, a disk configuration. The medium movement direction 85 corresponds to the relative movement direction between the magnetic recording medium 80 and the magnetic head 50. The relative movement direction is, for example, the circumferential direction of a magnetic recording medium having a disk configuration.

A magnetization 83 of each of the multiple magnetic recording components 84 is controlled by a magnetic field applied from the recording unit 60 of the magnetic head 50. The magnetization 83 that is controlled is used as information. Thereby, a recording operation of the information is implemented.

In the embodiment, the magnetic recording medium 80 is a perpendicular magnetic recording medium. For example, the magnetization 83 intersects the surface of the medium substrate 82. For example, the magnetization 83 is substantially perpendicular to the surface of the medium substrate 82. For example, the magnetization 83 has the two states of upward or downward. For example, the direction from the magnetic recording medium 80 toward the recording unit 60 is upward. For example, the direction from the recording unit 60 toward the magnetic recording medium 80 is downward.

In the example, the recording unit 60 includes a magnetic pole 61, a recording coil 61a, and a shield 63. A magnetic field (a recording magnetic field) is generated from the magnetic pole 61 by the recording coil 61a. The magnetization 83 of the magnetic recording component 84 is controlled by the recording magnetic field. By providing the shield 63, the strength of the recording magnetic field is increased; and the controllability is improved.

On the other hand, the information (the magnetization 83) that is recorded in the multiple magnetic recording components 84 is reproduced by the reproducing unit 70. Thereby, the reproduction operation is implemented.

In the example, the reproducing unit 70 includes a reproducing element 71, a first reproducing unit shield 72a, and a second reproducing unit shield 72b. The reproducing element 71 is provided between the shields. The reproducing element 71 includes, for example, an element having a magnetoresistance effect, etc.

For example, the direction connecting the reproducing unit 70 and the recording unit 60 is aligned with the medium movement direction 85. The direction connecting the shield 63 and the magnetic pole 61 is aligned with the medium movement direction 85.

A designated portion 80p of the magnetic recording medium 80 opposes the shield 63 after opposing the magnetic pole 61.

The direction from the magnetic recording medium 80 toward the recording unit 60 is taken as a Z-axis direction. One direction orthogonal to the Z-axis direction is taken as an X-axis direction. A direction orthogonal to the Z-axis direction and the X-axis direction is taken as a Y-axis direction.

The magnetic recording medium 80 includes multiple tracks (e.g., a first track Tr1, a second track Tr2, etc.). Each of the multiple tracks includes the multiple magnetic recording components 84. The multiple magnetic recording components 84 that are included in each of the multiple tracks are arranged along a down-track direction. The multiple tracks are arranged along a track width direction.

For example, the down-track direction is aligned with the X-axis direction. The down-track direction is parallel to the medium-opposing surface 51. The down-track direction is aligned with the direction from the magnetic pole 61 toward the shield 63.

The track width direction is aligned with the Y-axis direction. The track width direction is parallel to the medium-opposing surface 51. The track width direction is perpendicular to the direction from the magnetic pole 61 toward the shield 63.

In the embodiment, each of the multiple tracks includes multiple sub-tracks. For example, the first track Tr1 includes a first sub-track Ts1 and a second sub-track Ts2. The second track Tr2 includes a third sub-track Ts3 and a fourth sub-track Ts4. Examples of the tracks are described below.

A controller 55 is further provided in the magnetic recording and reproducing device 150. The controller 55 controls the operations of the recording unit 60. For example, the controller 55 acquires the information recorded in the magnetic recording medium 80 and generates the information relating to the state of each of the magnetic recording components 84 of the tracks provided in the magnetic recording medium 80. The controller 55 controls the operations of the recording unit 60 based on the generated information. The controller 55 may control the reproducing unit 70. The controller 55 may process the information reproduced by the reproducing unit 70.

FIG. 3 illustrates a head slider to which the magnetic head 50 is mounted.

The magnetic head 50 is mounted to the head slider 3. The head slider 3 includes, for example, $Al_2O_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic head 50 is disposed at the side surface of the air outflow side 3B of the head slider 3 or the like. Thereby, the magnetic head 50 that is mounted to the head slider 3 moves relative to the magnetic recording medium 80 while flying over or contacting of the magnetic recording medium 80.

The magnetic head 50 according to the embodiment may record the information in the magnetic recording medium 80 by shingled magnetic recording (SMR) described below.

FIG. 1 illustrates the magnetic recording medium 80.

As shown in FIG. 1, the magnetic recording medium 80 includes the first track Tr1 and the second track Tr2. The first track Tr1 and the second track Tr2 extend in a first direction (e.g., the X-axis direction).

The first track Tr1 includes the first sub-track Ts1 and the second sub-track Ts2. The first sub-track Ts1 and the second sub-track Ts2 extend in the first direction (e.g., the X-axis direction).

The first sub-track Ts1 includes the multiple magnetic recording components 84 (multiple first magnetic recording components 84a)). The positions of the multiple first magnetic recording components 84a in the first direction are different from each other. For example, the multiple first magnetic recording components 84a are arranged along the first direction.

The second sub-track Ts2 is arranged with the first sub-track Ts1 in a second direction. The second direction intersects the first direction. In the example, the second direction is the Y-axis direction. The second sub-track Ts2 includes the multiple magnetic recording components 84 (multiple second magnetic recording components 84b). The positions of the multiple second magnetic recording components 84b in the first direction are different from each other. For example, the multiple second magnetic recording components 84b are arranged along the first direction.

The second track Tr2 includes the third sub-track Ts3 and the fourth sub-track Ts4. The third sub-track Ts3 and the fourth sub-track Ts4 extend in the X-axis direction.

The third sub-track Ts3 is arranged with the second sub-track Ts2 in the second direction. The third sub-track Ts3 includes the multiple magnetic recording components 84 (multiple third magnetic recording components 84c). The positions of the multiple third magnetic recording components 84c in the first direction are different from each other. For example, the multiple third magnetic recording components 84c are arranged along the first direction.

The fourth sub-track Ts4 is arranged with the third sub-track Ts3 in the second direction. The fourth sub-track Ts4 includes the multiple magnetic recording components 84 (multiple fourth magnetic recording components 84d). The positions of the multiple fourth magnetic recording components 84d in the first direction are different from each other. For example, the multiple fourth magnetic recording components 84d are arranged along the first direction.

The second sub-track Ts2 is disposed between the first sub-track Ts1 and the fourth sub-track Ts4. The third sub-track Ts3 is disposed between the second sub-track Ts2 and the fourth sub-track Ts4.

For example, the information relating to the direction in which the multiple tracks (e.g., the first track Tr1, the second track Tr2, etc.) and the multiple sub-tracks (e.g., the first to fourth sub-tracks Ts1 to Ts4, etc.) extend is obtained by a MFM (Magnetic Force Microscope), etc.

Thus, in the embodiment, multiple sub-tracks are provided in one track. The distance is narrow between the sub-tracks inside the one track. The distance between the sub-tracks is shorter than the distance between the tracks.

For example, a distance wt between the second sub-track Ts2 and the third sub-track Ts3 is longer than a distance ws1 between the first sub-track Ts1 and the second sub-track Ts2. The distance wt is longer than a distance ws2 between the third sub-track Ts3 and the fourth sub-track Ts4. The distance ws1 and the distance ws2 may be substantially zero. In other words, the first sub-track Ts1 may contact the second sub-track Ts2. The third sub-track Ts3 may contact the fourth sub-track Ts4.

The lengths (first to fourth lengths w1 to w4) in the Y-axis direction of the sub-tracks are longer than the distance wt.

For example, the multiple first magnetic recording components 84a of the first sub-track Ts1 include a first component E1, a second component E2, a fifth component E5, a seventh component E7, etc. The second component E2 is provided to be adjacent to the first component E1 in the first direction (the X-axis direction). The first component E1 is provided between the fifth component E5 and the second component E2. The first component E1 is provided to be adjacent to the fifth component E5 in the first direction. The fifth component E5 is provided between the seventh component E7 and the first component E1. The fifth component E5 is provided to be adjacent to the seventh component E7 in the first direction.

The multiple second magnetic recording components 84b of the second sub-track Ts2 include a third component E3, a fourth component E4, a sixth component E6, and an eighth component E8. The third component E3 is provided to be adjacent to the first component E1 in the second direction (the Y-axis direction). The fourth component E4 is provided to be adjacent to the third component E3 in the first direction (the X-axis direction). The fourth component E4 is provided to be adjacent to the second component E2 in the second direction. The sixth component E6 is provided to be adjacent to the fifth component E5 in the second direction. The third component E3 is provided to be adjacent to the sixth component E6 in the first direction. The eighth component E8 is provided to be adjacent to the seventh component E7 in the second direction. The sixth component E6 is provided to be adjacent to the eighth component in the first direction.

One recording symbol is formed of two magnetic recording components 84 (e.g., one of the first magnetic recording components 84a and one of the second magnetic recording components 84b) arranged in the Y-axis direction. A first recording symbol Rb1 is formed of the first component E1 and the third component E3. A second recording symbol Rb2 is formed of the second component E2 and the fourth component E4. A third recording symbol Rb3 is formed of the fifth component E5 and the sixth component E6. A fourth recording symbol Rb4 is formed of the seventh component E7 and the eighth component E8. The information is recorded (stored) in the multiple recording symbols provided in the first track Tr1.

On the other hand, the multiple third magnetic recording components 84c of the third sub-track Ts3 include, for example, a ninth component E9 and a tenth component E10. The tenth component E10 is provided to be adjacent to the ninth component E9 in the first direction (the X-axis direction).

The multiple fourth magnetic recording components 84d of the fourth sub-track Ts4 include an eleventh component E11 and a twelfth component E12. For example, the eleventh component E11 is provided to be adjacent to the ninth component E9 in the second direction (the Y-axis direction). The twelfth component E12 is provided to be adjacent to the eleventh component E11 in the first direction. The twelfth component E12 is provided to be adjacent to the tenth component E10 in the second direction.

A fifth recording symbol Rb5 is formed of the ninth component E9 and the eleventh component E11. A sixth recording symbol Rb6 is formed of the tenth component E10 and the twelfth component E12. The information is recorded (stored) in the multiple recording symbols provided in the second track Tr2.

A length w1 in the second direction (the Y-axis direction) of the first sub-track Ts1 is not less than 5 nanometers and not more than 40 nanometers. A length w2 in the second direction (the Y-axis direction) of the second sub-track is not less than 5 nanometers and not more than 40 nanometers. This is similar for the other sub-tracks. In the case where the length in the second direction of the sub-track is less than 5 nanometers, for example, the length in the second direction of the sub-track is shorter than the size of the crystal grain included in the magnetic recording medium 80; and a sufficient SNR may not be obtained. In the case where the length in the second direction of the sub-track is longer than 40 nanometers, the recording density is low.

The spacing (i.e., the distance ws1) between the first sub-track Ts1 and the second sub-track Ts2 is not more than 1/10 of the length w1 in the second direction of the first sub-track Ts1 and not more than 1/10 of the length w2 in the second direction of the second sub-track Ts2. The length in the second direction of the first recording symbol Rb1 can be reduced by shortening the distance ws1. Thereby, the recording density can be improved.

A length L in the first direction (the X-axis direction) of each of the multiple magnetic recording components 84 (e.g., the first magnetic recording components 84a) of the sub-track (e.g., the first sub-track Ts1) is not less than 5 nanometers and not more than 20 nanometers. For example, in the case where the length L is less than 5 nanometers, the length in the first direction of the sub-track is shorter than the size of the crystal grain included in the magnetic recording medium 80; and a sufficient SNR may not be obtained. By setting the length L to be 5 nanometers or more, stable recording/reproducing can be performed. In the case where the length L exceeds 20 nanometers, the recording density is low.

The recording unit 60 records the information in the first sub-track Ts1 and the second sub-track Ts2 by controlling the magnetization of each of the multiple first magnetic recording components 84a of the first sub-track Ts1 and the magnetization of each of the multiple second magnetic recording components 84b of the second sub-track Ts2. In other words, the information is recorded in the first track Tr1.

The recording unit 60 also records the information in the third sub-track Ts3 and the fourth sub-track Ts4 by controlling the magnetization of each of the multiple third magnetic recording components 84c of the third sub-track Ts3 and the magnetization of each of the multiple fourth magnetic recording components 84d of the fourth sub-track Ts4. In other words, the information is recorded in the second track Tr2.

The reproducing unit 70 reproduces the information recorded in the first track Tr1 and the second track Tr2. At this time, the reproducing unit 70 substantially simultaneously senses the states of the two sub-tracks included in each track. For example, the reproducing element 71 of the reproducing unit 70 simultaneously opposes the first sub-track Ts1, the second sub-track Ts2, and a boundary Bs1 between the first sub-track Ts1 and the second sub-track Ts2.

A length Lr in the second direction (the Y-axis direction) of the reproducing element 71 of the reproducing unit 70 is longer than the length w1 in the second direction of the first sub-track Ts1 and longer than the length w2 in the second direction of the second sub-track Ts2. The length Lr is not less than 0.4 times and not more than 1 times the total of the length w1, the length w2, and the distance ws1. In the case where the length Lr is less than 0.4 times the total of the length w1, the length w2, and the distance ws1, the reproduction level when the recording symbol is 0 changes greatly due to unsteadiness of the head when recording/reproducing; and a sufficient SNR may not be obtained. By setting the length Lr to be not less than 0.4 times the total of the length w1, the length w2, and the distance ws1, stable reproducing can be performed. In the case where the length Lr exceeds the total of the length w1, the length w2, and the distance ws1, for example, the medium magnetization between the first track Tr1 and the second track Tr2 is sensed as noise; and a sufficient SNR may not be obtained. The reproducing unit 70 (the reproducing element 71) does not simultaneously oppose the first track Tr1 and the second track Tr2. The length Lr is longer than the distance between the first track Tr1 and the second track Tr2 (the distance wt between the second sub-track Ts2 and the third sub-track Ts3).

The following is performed when reproducing the information recorded in the first track Tr1.

The reproducing unit 70 senses, along the first direction (the X-axis direction), the values corresponding to the magnetization of each of the multiple first magnetic recording components 84a of the first sub-track Ts1 and the magnetization of each of the multiple second magnetic recording components 84b of the second sub-track Ts2 while opposing the first sub-track Ts1, the second sub-track Ts2, and the boundary Bs1 between the first sub-track Ts1 and the second sub-track Ts2. Thereby, the reproducing unit 70 reproduces the recorded information.

For example, in the state in which the reproducing element 71 of the reproducing unit 70 opposes the first sub-track Ts1, the second sub-track Ts2, and the boundary Bs1, the reproducing element 71 sequentially senses, along the first direction (the X-axis direction), the values corresponding to the magnetization of each of the multiple first magnetic recording components 84a of the first sub-track Ts1 and the magnetization of each of the multiple second magnetic recording components 84b of the second sub-track Ts2. For example, the electrical resistance of the reproducing element 71 changes according to the states of the magnetizations. In other words, the reproducing unit 70 sequentially reproduces, along the first direction, the values corresponding to the magnetizations.

For example, the following is performed when reproducing the information recorded in the second track Tr2. The reproducing unit 70 (the reproducing element 71) reproduces the information recorded in the second track Tr2 by sensing, along the first direction, the values corresponding to the magnetization of each of the multiple third magnetic recording components 84c of the third sub-track Ts3 and the magnetization of each of the multiple fourth magnetic recording components 84d of the fourth sub-track Ts4 while opposing the third sub-track Ts3, the fourth sub-track Ts4, and a boundary Bs2 between the third sub-track Ts3 and the fourth sub-track Ts4.

In the embodiment, for example, ternary information is recorded in the multiple tracks (the first track Tr1, the second track Tr2, etc.); and the information is reproduced. For example, ternary information is recorded in each of the first recording symbol Rb1, the second recording symbol Rb2, the third recording symbol Rb3, the fourth recording symbol Rb4, the fifth recording symbol Rb5, and the sixth recording symbol Rb6.

The ternary state is formed of the states of the magnetizations of two magnetic recording components 84 included in one recording symbol.

FIG. 4A to FIG. 4P are schematic plan views illustrating a portion of the magnetic recording and reproducing device according to the first embodiment.

These drawings illustrate the state of the magnetization of the recording symbol. FIG. 4A to FIG. 4D correspond to the first recording symbol Rb1. FIG. 4E to FIG. 4H correspond to the second recording symbol Rb2. FIG. 4I to FIG. 4L correspond to the third recording symbol Rb3. FIG. 4M to FIG. 4P correspond to the fourth recording symbol Rb4.

In the first recording symbol Rb1 as shown in FIG. 4A, the magnetization of the first component E1 is in a first state St1; and the magnetization of the third component E3 is in the first state St1. In the first state St1, for example, the magnetization is one of upward or downward. At this time, the information that is recorded in the first recording symbol Rb1 is set to a first value. The first value is, for example, "+1."

As shown in FIG. 4D, the magnetization of the first component E1 is in a second state St2; and the magnetization of the third component E3 is in the second state St2. In the second state St2, for example, the magnetization is the other of upward or downward. At this time, the information that is recorded in the first recording symbol Rb1 is set to a second value. The second value is, for example, "−1."

As shown in FIG. 4B, the magnetization of the first component E1 is in the first state St1; and the magnetization of the third component E3 is in the second state St2. At this time, the information that is recorded in the first recording symbol Rb1 is set to a third value. The third value is, for example, "0."

As shown in FIG. 4C, the magnetization of the first component E1 is in the second state St2; and the magnetization of the third component E3 is in the first state St1. At this time, the information that is recorded in the first recording symbol Rb1 is the third value. Thus, the states of both FIG. 4B and FIG. 4C correspond to the third value ("0"). The state of FIG. 4B is called a state S12. The state of FIG. 4C is called a state S21.

Similar states are formed in the other recording symbols as well.

In the second recording symbol Rb2 as shown in FIG. 4E, the magnetization of the second component E2 is in the first state St1; and the magnetization of the fourth component E4 is in the first state St1. At this time, the information that is recorded in the second recording symbol Rb2 is the first value (e.g., "+1").

As shown in FIG. 4H, the magnetization of the second component E2 is in the second state St2; and the magnetization of the fourth component E4 is in the second state St2. At this time, the information that is recorded in the second recording symbol Rb2 is the second value (e.g., "−1").

As shown in FIG. 4F, the magnetization of the second component E2 is in the first state St1; and the magnetization of the fourth component E4 is in the second state St2. At this time, the information that is recorded in the second recording symbol Rb2 is the third value (e.g., "0").

As shown in FIG. 4G, the magnetization of the second component E2 is in the second state St2; and the magnetization of the fourth component E4 is in the first state St1. At this time, the information that is recorded in the second recording symbol Rb2 is the third value (e.g., "0").

In the third recording symbol Rb3 as shown in FIG. 4I, the information that is recorded in the third recording symbol Rb3 is the first value (e.g., "+1") when the magnetization of the fifth component E5 and the magnetization of the sixth component E6 are in the first state St1. The information is the second value (e.g., "−1") when the magnetization of the fifth component E5 and the magnetization of the sixth component E6 are in the second state St2 (referring to FIG. 4L). The information is the third value (e.g., "0") when the states of the magnetizations are different from each other for the fifth component E5 and the sixth component E6 (referring to FIG. 4J and FIG. 4K).

In the fourth recording symbol Rb4 as shown in FIG. 4M, the information is the first value (e.g., "+1") when the magnetization of the seventh component E7 and the magnetization of the eighth component E8 are in the first state St1. The information is the second value (e.g., "−1") when the magnetization of the seventh component E7 and the magnetization of the eighth component E8 are in the second state St2 (referring to FIG. 4P). The information that is recorded in the fourth recording symbol Rb4 is the third value (e.g., "0") when the magnetization of the seventh component E7 is in the second state St2 and the magnetization of the eighth component E8 is in the first state St1 (referring to FIG. 4O). The information that is recorded in the fourth recording symbol Rb4 is the third value (e.g., "0") when the magnetization of the seventh component E7 is in the first state St1 and the magnetization of the eighth component E8 is in the second state St2 (referring to FIG. 4N).

Thus, in the embodiment, the value is the first value (e.g., "+1") when both of the two components included in the recording symbol are the first state St1; and the value is the second value (e.g., "−1") when both are in the second state St2. The value is the third value (e.g., "0") when the two components are in mutually-different states. Thus, in the embodiment, ternary information is recorded/reproduced.

In such a case, for example, the two states of the state S12 shown in FIG. 4B and the state S21 shown in FIG. 4C are included in the third value. For example, when recording the third value, the state S12 may be formed or the state S21 may be formed.

In the example shown in FIG. 1, the third recording symbol Rb3 is the first value ("+1"). The first recording symbol Rb1 is the third value ("0"); and the second recording symbol Rb2 is the third value. In the first recording symbol Rb1 in the example, the first component E1 is in the first state St1; and the third component E3 is in the second state St2. In other words, the state S12 shown in FIG. 4B is provided in the first recording symbol Rb1. On the other hand, in the second recording symbol Rb2, the second component E2 is in the second state St2; and the fourth component E4 is in the first state St1. In other words, the state S21 shown in FIG. 4C is provided in the second recording symbol Rb2.

Thus, for example, although the state S12 may be formed or the state S21 may be formed when recording the third value, in the embodiment, at least one set of two recording symbols adjacent to each other in the X-axis direction having mutually-different states is provided when recording the third value. In the at least one set, the states of the two magnetic recording components 84 adjacent to each other in the X-axis direction are different from each other.

For example, the recording of the third value would not be performed by forming only the state S12 of FIG. 4B. The recording of the third value would not be performed by forming only the state S21 of FIG. 4C.

For example, the first value, the second value, and the third value are provided in the recording track according to the recorded information. The magnetizations of the magnetic recording components 84 that correspond to the first value and the second value are determined according to the recorded information. On the other hand, for the magnetizations of the magnetic recording components 84 that correspond to the third value, the state is the state S12 of FIG. 4B or the state S21 of FIG. 4C and can be selected. In the embodiment, the state S12 of FIG. 4B is not set to be continuous over a long interval. Or, the state S21 of FIG. 4C is not set to be continuous over a long interval.

Thereby, as described below, stable magnetic recording and reproducing are possible.

The experimental results on which the creation of the configuration according to the embodiment is based will now be described.

FIG. 5A to FIG. 5F are schematic views illustrating characteristics of the magnetic recording and reproducing device.

FIG. 5A, FIG. 5C, and FIG. 5E illustrate the states of the first sub-track Ts1 and the second sub-track Ts2 in which different information is recorded. The length in the Y-axis direction of one magnetic recording component 84 (corresponding to the first length w1 or the second length w2 referring to FIG. 1) is 60 nm. The length L in the X-axis direction of one magnetic recording component 84 (referring to FIG. 1) is 12 nm. The length Lr in the second direction (the Y-axis direction) of the reproducing element 71 (referring to FIG. 1) is 50 nm.

For the recorded information in the example of FIG. 5A, the first value (e.g., "+1") and the second value (e.g., "−1") are arranged alternately every two magnetic recording components 84 arranged in the X-axis direction.

For the recorded information in the example of FIG. 5C and FIG. 5E, the first value (e.g., "+1") and the third value (e.g., "0") are arranged alternately every two magnetic recording components 84 arranged in the X-axis direction.

In FIG. 5C, all of the magnetic recording components 84 (the first magnetic recording components 84a) are in the first state St1 in the first sub-track Ts1. In the second sub-track Ts2, the first state St1 and the second state St2 are arranged alternately every two magnetic recording components 84 (second magnetic recording components 84b) arranged in the X-axis direction. The third value is formed of the state S12.

On the other hand, in FIG. 5E, the first state SU and the second state St2 are arranged alternately every two magnetic recording components 84 (first magnetic recording components 84a) arranged in the X-axis direction in the first sub-track Ts1. In the second sub-track Ts2, all of the magnetic recording components 84 (the second magnetic recording components 84b) are in the first state St1. The third value is formed of the state S21.

Thus, in the case where the first value and the third value change alternately every two magnetic recording components 84 arranged in the X-axis direction, the recording can be using the two states of FIG. 5C and FIG. 5E.

FIG. 5B, FIG. 5D, and FIG. 5F are graphs of the measurement results of the reproduction output and correspond respectively to FIG. 5A, FIG. 5C, and FIG. 5E.

In the measurement, the reproducing element 71 and the sub-tracks move relatively along the X-axis direction at one position in the Y-axis direction. The output signal oscillates to correspond to "+1" and "−1" with the relative movement of the X-axis direction. For example, the voltage of the reproduction signal is high at the position in the X-axis direction corresponding to "+1" inside the track. On the other hand, for example, the voltage of the reproduction signal is low at the position in the X-axis direction corresponding to "−1" inside the track. Thus, a signal having a prescribed amplitude is obtained for one relative movement along the X-axis direction. The amplitude is used as an evaluation parameter. Then, the one relative movement along the X-axis direction is multiply implemented while modifying the position in the Y-axis direction. Thereby, the value of the amplitude of the signal is obtained at different multiple positions in the Y-axis direction.

In FIG. 5B, FIG. 5D, and FIG. 5F, the horizontal axis is a position Py (μm) in the Y-axis direction. The vertical axis is an amplitude Asg (arbitrary units) of the output signal. The position (a reference position) where the position Py is 0 corresponds to the boundary Bs1 between the first sub-track Ts1 and the second sub-track Ts2.

As illustrated in FIG. 5B, in the recording state in which the first value and the second value are arranged alternately in the X-axis direction, the amplitude Asg has a maximum at the reference position (the position of the boundary Bs1 where the position Py is 0). In other words, the maximum amplitude is obtained for the reproduction signal corresponding to "+1" and "−1" at the position of the boundary Bs1. The amplitude Asg decreases as the position Py becomes distal to the reference position. In the example, the amplitude Asg at the reference position is about 2800 (arbitrary units).

On the other hand, in the recording state corresponding to FIG. 5C as shown in FIG. 5D, the peak position of the amplitude Asg is shifted from the reference position. In other words, the amplitude Asg is asymmetric with respect to the reference position. In the example, the direction of the shift is the negative direction. The amplitude at the reference position is about 3600 (arbitrary units).

In the recording state corresponding to FIG. 5E as shown in FIG. 5F as well, the peak position of the amplitude Asg is shifted from the reference position. The amplitude Asg is asymmetric with respect to the reference position. In the example, the direction of the shift is positive and is the reverse of the example of FIG. 5D. The amplitude at the reference position is about 1700 (arbitrary units).

Thus, different characteristics are obtained for the two types of recording states corresponding to the third value (the examples of FIG. 5C and FIG. 5E).

Prior to implementing the experiment, the inventor predicted that the amplitude Asg would be symmetric with respect to the reference position for the recording symbol of the third value for the case of FIG. 5C and the case of FIG. 5E. Also, it was predicted that the amplitude Asg at the reference position would be about ½ of 2800 which is the amplitude Asg corresponding to the first value. In other words, it was predicted that the same reproduction result would be obtained for the two types of recording states corresponding to the third value.

However, the experimental results were different from the predictions. Namely, different amplitudes Asg were obtained for the recording state illustrated in FIG. 5C and the recording state illustrated in FIG. 5E. In other words, the on-track amplitude Asg is unbalanced for the two types of recording states corresponding to the third value.

The cause of this phenomenon may be as follows.

In the example of FIG. 5C, it is considered that the magnetic field from the first sub-track Ts1 which is the continuous first state St1 extends into the second sub-track Ts2 and affects the magnetizations of the second magnetic recording components 84b in the second state St2 of the second sub-track Ts2. On the other hand, in the example of FIG. 5C, it is considered that the magnetic field from the second sub-track Ts2 which is the continuous first state St1 extends into the first sub-track Ts1 and affects the magnetizations of the first magnetic recording components 84a in the second state St2 of the first sub-track Ts1.

In the state S12 that forms the third value, a magnetic field (a sneak magnetic field) is generated in the Y-axis direction by the first sub-track Ts1 and the second sub-track Ts2. In the state S21 that forms the third value as well, a magnetic field is generated in the Y-axis direction by the first sub-track Ts1 and the second sub-track Ts2. The direction of the magnetic field (the sneak magnetic field) that is generated in the Y-axis direction is different between the state S12 and the state S21. Namely, the direction of the magnetic field in the Y-axis direction is reversed.

It is considered that such a magnetic field having a Y-axis direction component affects the reproduction signal of the reproducing element 71. In other words, in the reproducing element 71, the magnetic field (the sneak magnetic field) in the Y-axis direction recited above is applied in addition to the magnetic field due to the magnetizations of the magnetic recording components 84 of each of the two sub-tracks. Thereby, it is considered that the different output signals are obtained between the state S12 and the state S21.

Figures 6A, 6B:
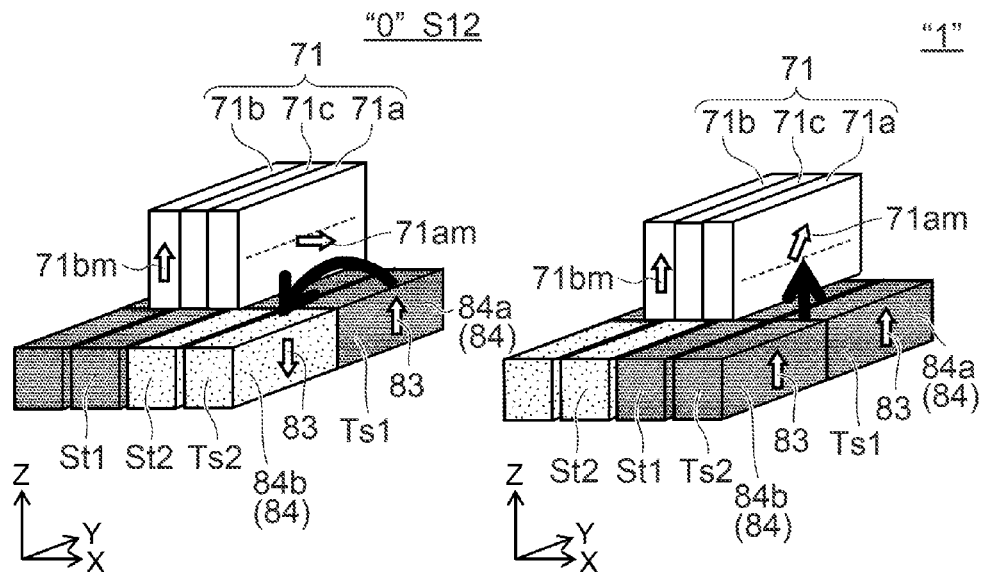
FIG. 6A to FIG. 6D are schematic perspective views showing characteristics of the magnetic recording and reproducing device.
Figures 6C, 6D:
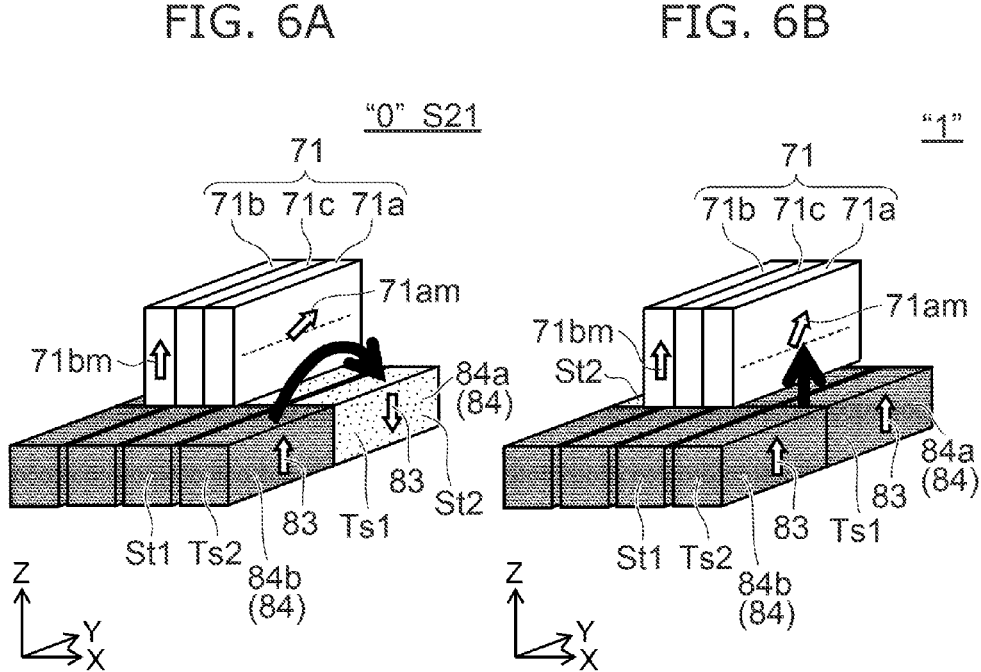

FIG. 6A to FIG. 6D are schematic perspective views illustrating characteristics of the magnetic recording and reproducing device. These drawings illustrate the characteristics when the information recorded in the magnetic recording medium 80 is reproduced by the reproducing element 71 of the reproducing unit 70. FIG. 6A corresponds to "0" (the state S12) illustrated in FIG. 5C. FIG. 6B corresponds to "+1" illustrated in FIG. 5C. FIG. 6C corresponds to "0" (the state S21) illustrated in FIG. 5E. FIG. 6D corresponds to "+1" illustrated in FIG. 5E.

As shown in these drawings, the reproducing element includes a first magnetic layer 71a, a second magnetic layer 71b, and an intermediate layer 71c. The first magnetic layer 71a is separated from the second magnetic layer 71b in the X-axis direction. For example, a magnetization 71*am* of the first magnetic layer 71*a* is changeable. For example, the first magnetic layer 71*a* is a free magnetic layer. For example, a magnetization 71*bm* of the second magnetic layer 71*b* is fixed. For example, the second magnetic layer 71*b* is a fixed magnetic layer. The magnetizations of both may be changeable. The intermediate layer 71*c* is, for example, nonmagnetic.

For example, the magnetization 71*bm* of the second magnetic layer 71*b* is fixed in the Z-axis direction. When the magnetic field (the medium magnetic field) from the magnetic recording medium 80 is not applied to the reproducing element 71, the magnetization 71*am* of the first magnetic layer 71*a* is aligned with a direction (in the example, the Y-axis direction) intersecting the Z-axis direction.

As shown in FIG. 6B and FIG. 6D, when the first sub-track Ts1 and the second sub-track Ts2 of the magnetic recording medium 80 are in the first state St1, a medium magnetic field aligned with the Z-axis direction is applied to the first magnetic layer 71*a*. Thereby, the magnetization 71*am* of the first magnetic layer 71*a* rotates toward the Z-axis direction. Thereby, "+1" (the first value) is reproduced.

On the other hand, as shown in FIG. 6A, in the case of "0" of the state S12, a medium magnetic field is generated that has a component in the direction from the first sub-track Ts1 toward the second sub-track Ts2. Thereby, for example, the magnetization 71*am* of the first magnetic layer 71*a* rotates in the Z-Y plane. In the example, the tip of the arrow of the magnetization 71*am* of the first magnetic layer 71*a* rotates to approach the first sub-track Ts1.

As shown in FIG. 6C, in the case of "0" of the state S21, a medium magnetic field is generated that has a component in the direction from the second sub-track Ts2 toward the first sub-track Ts1. Thereby, for example, the magnetization 71*am* of the first magnetic layer 71*a* rotates in the Z-Y plane. In the example, the tip of the arrow of the magnetization 71*am* of the first magnetic layer 71*a* rotates away from the first sub-track Ts1.

The rotation direction of the arrow of the magnetization 71*am* of FIG. 6A is the reverse of the rotation direction of the arrow of the magnetization 71*am* of FIG. 6C.

The angle between the direction of the magnetization 71*am* shown in FIG. 6A and the direction of the magnetization 71*am* shown in FIG. 6B is larger than the angle between the direction of the magnetization 71*am* shown in FIG. 6C and the direction of the magnetization 71*am* shown in FIG. 6D. Thereby, it is considered that the asymmetric characteristic of FIG. 5D corresponding to FIG. 5C is obtained and the asymmetric characteristic of FIG. 5F corresponding to FIG. 5E is obtained.

There are also cases where the magnetization 71*am* of the first magnetic layer 71*a* is tilted with respect to the Y-axis direction when the magnetic field (the medium magnetic field) from the magnetic recording medium 80 is not applied to the reproducing element 71. In such a case, it is considered that the asymmetric characteristic occurs when the medium magnetic field that has the component in the Y-axis direction is applied to the first magnetic layer 71*a*.

It is considered that the medium magnetic field that has the component in the Y-axis direction is strengthened when the magnetic recording components 84 having the same state are continuous.

Thus, there is a possibility that the magnetic field due to the continuous magnetic recording components 84 having the same state existing in one sub-track affects the magnetizations of the magnetic recording components 84 of the other sub-track due to the extension of the magnetic field. There is also a possibility that the magnetic field that is generated in the Y-axis direction may affect the characteristics of the reproducing element 71.

In the case where the number of continuous magnetic recording components 84 having the same state is large, it is considered that these effects become large and the fluctuation of the amplitude Asg at the reference position becomes large. When the same state is continuous, noise occurs due to the effects between the adjacent sub-tracks. The noise that occurs when the same state is continuous is called intermediate noise for convenience.

Thereby, it is considered that the difference occurs between the two recording states illustrated in FIG. 5D and FIG. 5F. The precision of the sensing of the third value decreases because the different amplitudes Asg are obtained for the two recording states. There is a possibility of reproduction error. It is favorable for the difference between the amplitudes when reproducing to be small for the two types of recording states corresponding to the third value. In other words, it is favorable for the intermediate noise to be suppressed.

The embodiment solves the challenges newly-discovered by the experiments recited above.

Namely, the multiple magnetic recording components 84 that correspond to the third value are set so that the state S12 shown in FIG. 4B is not set to be continuous over a long interval. Or, the state S21 shown in FIG. 4C is not set to be continuous over a long interval.

For example, as described in regard to FIG. 1, the recording state is modified for the first recording symbol Rb1 and the second recording symbol Rb2 in which the third value is recorded continuously. For example, when recording the third value in the first recording symbol Rb1, the magnetization of the first component E1 is set to the first state St1, and the magnetization of the third component E3 is set to the second state St2. When recording the third value in the second recording symbol Rb2, the magnetization of the second component E2 is set to the second state St2, and the magnetization of the fourth component E4 is set to the first state St1. Thereby, the number of magnetic recording components 84 having the same state arranged continuously can be reduced. Thereby, the intermediate noise can be suppressed. Stable magnetic recording is possible.

Thus, the magnetic recording and reproducing device 150 and the magnetic recording direction (the magnetic recording pattern) according to the embodiment are based on the newly-discovered knowledge and the newly-discovered challenges based on the experimental results recited above.

For example, the recording pattern according to the embodiment is performed by the control of the recording unit 60 by the controller 55.

For example, the controller 55 that controls the recording unit 60 is provided in the embodiment. One of the multiple first magnetic recording components 84*a* of the first sub-track Ts1 and one of the multiple second magnetic recording components 84*b* of the second sub-track Ts2 exist so that the one of the multiple second magnetic recording components 84*b* is adjacent to the one of the multiple first magnetic recording components 84*a* in the second direction (the Y-axis direction). One of the multiple recording symbols arranged in the first direction (the X-axis direction) is formed of the one of the multiple first magnetic recording components 84*a* of the first sub-track Ts1 and the one of the multiple second magnetic recording components 84*b* of the second sub-track Ts2.

In such a case, the controller 55 performs the following when the recording unit 60 records the third value in one of the multiple recording symbols. For the first sub-track Ts1, the magnetization of the one of the multiple first magnetic recording components 84a of the first sub-track Ts1 included in the one of the multiple recording symbols is set to the first state St1 or the second state St2 to reduce the number of continuous magnetizations of the multiple first magnetic recording components 84a in the same state.

Further, the controller 55 performs the following when the recording unit 60 records the third value in the one of the multiple recording symbols. For the second sub-track Ts2, the magnetization of the one of the multiple second magnetic recording components 84b of the second sub-track Ts2 included in the one of the multiple recording symbols is set to the first state St1 or the second state St2 to reduce the number of continuous magnetizations of the multiple second magnetic recording components 84b in the same state.

Thereby, the number of magnetic recording components 84 having the same state arranged continuously can be small. Thereby, the extension of the magnetic field from the one sub-track continuously in the same state into the adjacent sub-track can be suppressed. Thereby, the effects of the magnetic field due to the continuous magnetic recording components 84 having the same state existing in the one sub-track on the magnetizations of the magnetic recording components 84 of the other sub-track can be suppressed. Thereby, the intermediate noise can be suppressed.

In the embodiment, the state of each of the magnetic recording components 84 included in the sub-track changes according to the information to be written. In the case where the information to be written is the first value or the second value, the state of the magnetic recording component 84 is determined. On the other hand, in the case where the information to be written is the third value, one of the two types of states (the state S12 or the state S21) is selected.

As illustrated in FIG. 1, in the case where the recording symbol for which the information to be written is the third value is continuous, the state S21 is set in the first recording symbol Rb1; and the state S21 is set in the second recording symbol Rb2.

On the other hand, in the example of FIG. 1, the fourth recording symbol Rb4 is the third value of the state S21; and the third recording symbol Rb3 is the first value. At this time, the eighth component E8 and the sixth component E6 which are continuous are in the first state St1. On the other hand, the seventh component E7 is in the second state St2; and the fifth component E5 is in the first state St1. In other words, the first sub-track Ts1 switches between the first state St1 and the second state St2 in the fourth recording symbol Rb4 and the third recording symbol Rb3. On the other hand, the first state St1 is continuous in the second sub-track Ts2. In such a case, when writing the third value to the first recording symbol Rb1, it is possible to employ one of the state S12 or the state S21.

At this time, in the embodiment, not the state S21 but the state S12 is applied when writing the third value to the first recording symbol Rb1. Thereby, for the second sub-track Ts2 in the fourth recording symbol Rb4, the third recording symbol Rb3, and the first recording symbol Rb1, the number of continuous magnetic recording components 84 having the first state St1 is 2. If the state S21 is employed when writing the third value to the first recording symbol Rb1, the number of continuous magnetic recording components 84 having the first state St1 is 3 in the second sub-track Ts2. The intermediate noise can be suppressed by reducing the number of continuous magnetic recording components 84.

Second Embodiment

Figure 7:
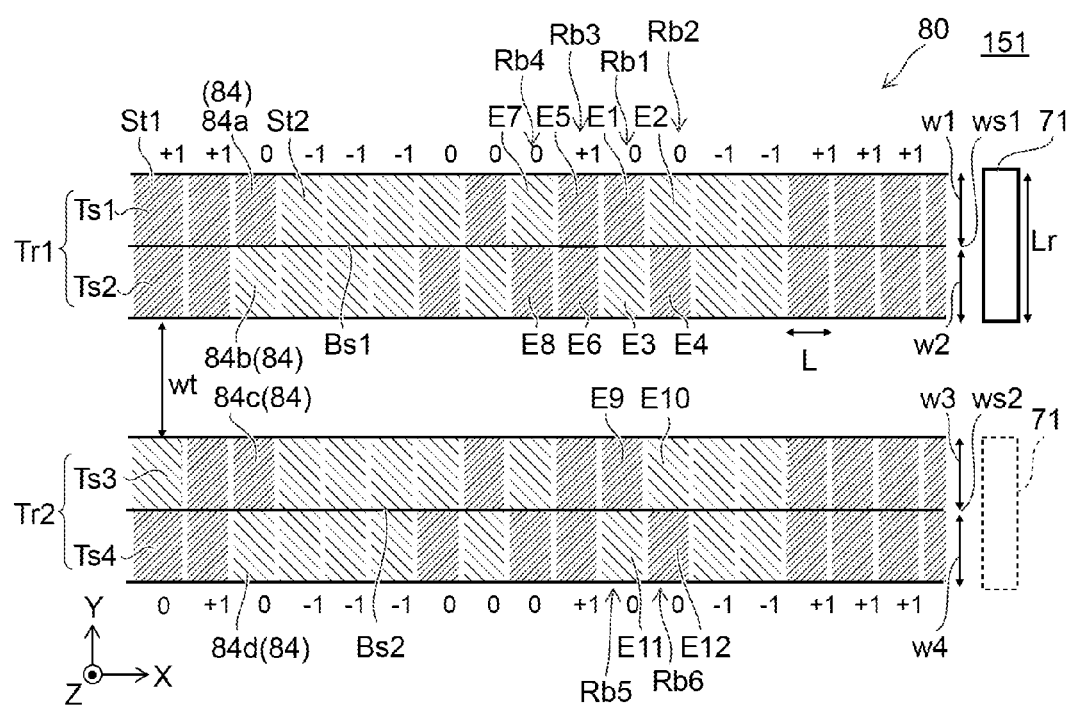
FIG. 7 is a schematic plan view showing a portion of a magnetic recording and reproducing device according to a second embodiment.

FIG. 7 is a schematic plan view illustrating a portion of a magnetic recording and reproducing device according to a second embodiment.

In the embodiment as shown in FIG. 7, the number of continuous magnetic recording components 84 having the same state is 4 or less. Thereby, a noise power ratio Rnp can be low. Thereby, as described below, stable magnetic recording and reproducing are possible.

The experimental results on which the creation of the configuration according to the embodiment is based will now be described.

FIG. 8A to FIG. 8F are schematic plan views illustrating recording states of the magnetic recording and reproducing device.

Figure 8A:
FIG. 8A to FIG. 8F are schematic plan views showing recording states of the magnetic recording and reproducing device.

FIG. 8A to FIG. 8F show six types of recording patterns used in the experiment. As shown in FIG. 8A, the first value and the second value are recorded alternately in a recording pattern 0T. In such a case, the first state St1 and the second state St2 are arranged alternately along the X-axis direction in the first sub-track Ts1 and in the second sub-track Ts2.

In the second sub-track Ts2 of the recording patterns of FIG. 8B to FIG. 8F, a set of the first state St1 and the second state St2 is arranged alternately along the X-axis direction.

Figure 8B:
Figure 8C:
Figure 8D:
Figure 8E:
Figure 8F:

In a recording pattern 1T as shown in FIG. 8B, the first state St1 and the second state St2 are arranged alternately along the X-axis direction in the first sub-track Ts1. In a recording pattern 2T as shown in FIG. 8C, a set of two first states St1 and two second states St2 is arranged alternately along the X-axis direction in the first sub-track Ts1. In a recording pattern 3T as shown in FIG. 8D, a set of three first states St1 and three second states St2 is arranged alternately along the X-axis direction in the first sub-track Ts1. In a recording pattern 4T as shown in FIG. 8E, a set of four first states St1 and four second states St2 is arranged alternately along the X-axis direction in the first sub-track Ts1. In a recording pattern 8T as shown in FIG. 8F, a set of eight first states St1 and eight second states St2 is arranged alternately along the X-axis direction in the first sub-track Ts1.

In other words, the number of continuous magnetic recording components 84 having the same state is different between the recording patterns 1T to 8T.

The amplitude Asg at the reference position (the position of the boundary Bs1 between the first sub-track Ts1 and the second sub-track Ts2) is determined for the six types of recording patterns (the recording patterns 0T and 1T to 8T). Here, the amplitude Asg at the reference position for the recording pattern 0T is used as a reference amplitude Asg0. The ratio (Asg/Asg0) of the amplitude Asg at the reference position to the reference amplitude Asg0 is used as the noise power ratio for the recording patterns 1T to 8T.

Figure 9:
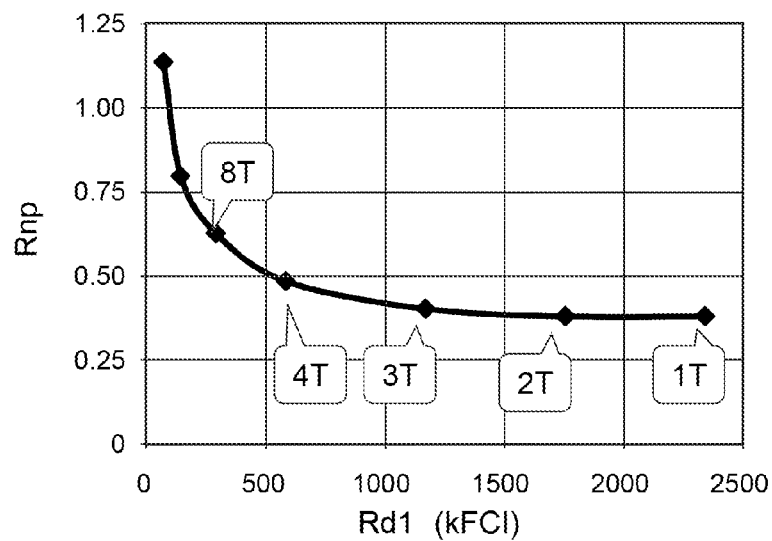
FIG. 9 is a graph of a characteristic of the magnetic recording and reproducing device.

FIG. 9 is a graph of a characteristic of the magnetic recording and reproducing device.

FIG. 9 is a graph of the change of the noise when the recording state (the recording pattern) of the magnetic recording components 84 of the magnetic recording medium 80 is changed. The horizontal axis is a monotone recording density Rd1 (kFCI or kilo FCI). The monotone recording density Rd1 changes due to the recorded pattern (the recording patterns 1T, 2T, 3T, 4T, 8T, etc.). The values of the five types of recording patterns (the recording patterns 1T, 2T, 3T, 4T, and 8T) are shown in FIG. 9. The unit FCI is flux change per inch. The vertical axis is the noise power ratio Rnp (a relative value).

As shown in FIG. 9, the noise power ratio Rnp decreases as the monotone recording density Rd1 increases. For example, the noise power ratio Rnp is 0.5 or less for the recording patterns 1T, 2T, 3T, and 4T. In other words, for these recording patterns, the amplitude Asg is not more than ½ of the reference amplitude Asg0 for the recording pattern 0T. Conversely, the noise power ratio Rnp is about 0.65 for the recording pattern 8T. When the number of continuous magnetic recording components 84 having the same state exceeds 4, the noise power ratio Rnp increases abruptly.

Thereby, it is favorable for the number of continuous magnetic recording components 84 having the same state to be 4 or less. Thereby, the noise power ratio Rnp can be low. Stable magnetic recording and reproducing are possible.

In other words, in the magnetic recording and reproducing device 151 according to the embodiment as shown in FIG. 7, the number of continuous multiple first magnetic recording components 84a having the magnetizations in the same state is 4 or less in the first sub-track Ts1. Also, the number of continuous multiple second magnetic recording components 84b having the magnetizations in the same state is 4 or less in the second sub-track Ts2.

Similarly to the magnetic recording and reproducing device 150, the magnetic recording and reproducing device 151 includes the magnetic recording medium 80, the recording unit 60, and the reproducing unit 70.

In such a case as well, the magnetic recording medium 80 includes the first track Tr1 as shown in FIG. 7. The first track Tr1 includes the first sub-track Ts1 that extends in the first direction (the X-axis direction), and the second sub-track that extends in the first direction and is arranged with the first sub-track Ts1 in the second direction (the Y-axis direction) intersecting the first direction. The first sub-track Ts1 includes the multiple first magnetic recording components 84a. The second sub-track Ts2 includes the multiple second magnetic recording components 84b.

One of the multiple recording symbols (the first to fourth recording symbols Rb1 to Rb4, etc.) arranged in the first direction is formed of one of the multiple first magnetic recording components 84a and one of the multiple second magnetic recording components 84b, where the one of the multiple second magnetic recording components 84b recited above is adjacent to the one of the multiple first magnetic recording components 84a recited above in the second direction.

The recording unit 60 records the information in the first sub-track Ts1 and the second sub-track Ts2 by controlling the magnetization of each of the multiple first magnetic recording components 84a of the first sub-track Ts1 and the magnetization of each of the multiple second magnetic recording components 84b of the second sub-track Ts2.

The reproducing unit 70 reproduces the information recorded in the first sub-track Ts1 and the second sub-track Ts2 while opposing the first sub-track Ts1, the second sub-track Ts2, and the boundary Bs1 between the first sub-track Ts1 and the second sub-track Ts2. For example, the reproducing unit 70 reproduces the information recorded in the first sub-track Ts1 and the second sub-track Ts2 by, for example, sensing, along the first direction, the values corresponding to the magnetization of each of the multiple first magnetic recording components 84a of the first sub-track Ts1 and the magnetization of each of the multiple second magnetic recording components 84b of the second sub-track Ts2.

The one of the multiple first magnetic recording components 84a of the first sub-track Ts1 recited above included in the one of the multiple recording symbols recited above has a first magnetization; and the one of the multiple second magnetic recording components 84b of the second sub-track Ts2 recited above included in the one of the multiple recording symbols recited above has a second magnetization.

At this time, the information that is recorded in the one of the multiple recording symbols recited above is the first value (e.g., "+1") when the first magnetization is in the first state St1 and the second magnetization is in the first state St1. The information that is recorded in the one of the multiple recording symbols recited above is the second value (e.g., "−1") when the first magnetization is in the second state St2 and the second magnetization is in the second state St2. The information that is recorded in the one of the multiple recording symbols recited above is the third value (e.g., "0") when the first magnetization is in the first state St1 and the second magnetization is in the second state St2, or when the first magnetization is in the second state St2 and the second magnetization is in the first state St1.

By setting the number of continuous magnetic recording components 84 having the same state to be 4 or less in such a configuration, stable magnetic recording and reproducing are possible.

In the example as well, as shown in FIG. 7, the magnetic recording medium 80 may further include the second track Tr2. The second track Tr2 includes the third sub-track Ts3 and the fourth sub-track Ts4. The third sub-track Ts3 extends in the first direction and includes the multiple third magnetic recording components 84c. The third sub-track Ts3 is arranged with the second sub-track Ts2 in the second direction. The fourth sub-track Ts4 extends in the first direction and includes the multiple fourth magnetic recording components 84d. The fourth sub-track Ts4 is arranged with the third sub-track Ts3 in the second direction.

The second sub-track Ts2 is disposed between the first sub-track Ts1 and the fourth sub-track Ts4. The third sub-track Ts3 is disposed between the second sub-track Ts2 and the fourth sub-track Ts4. One other of the multiple recording symbols (the fifth recording symbol Rb5, the sixth recording symbol Rb6, etc.) arranged in the first direction is formed of one of the multiple third magnetic recording components 84c of the third sub-track Ts3 and one of the multiple fourth magnetic recording components 84d of the fourth sub-track Ts4, where the one of the multiple fourth magnetic recording components 84d of the fourth sub-track Ts4 recited above is adjacent to the one of the multiple third magnetic recording components 84c of the third sub-track Ts3 recited above in the second direction.

The distance wt between the second sub-track Ts2 and the third sub-track Ts3 is longer than the distance ws1 between the first sub-track Ts1 and the second sub-track Ts2 and longer than the distance ws2 between the third sub-track and the fourth sub-track.

The recording unit 60 records information in the third sub-track Ts3 and the fourth sub-track Ts4 by controlling the magnetization of each of the multiple third magnetic recording components 84c of the third sub-track Ts3 and the magnetization of each of the multiple fourth magnetic recording components 84d of the fourth sub-track Ts4.

The reproducing unit 70 reproduces the information recorded in the third sub-track Ts3 and the fourth sub-track Ts4 while opposing the third sub-track Ts3, the fourth sub-track Ts4, and the boundary Bs2 between the third sub-track Ts3 and the fourth sub-track Ts4. The reproducing unit 70 reproduces the information recorded in the third sub-track Ts3 and the fourth sub-track Ts4 by, for example, sensing, along the first direction, the magnetization of each of the multiple third magnetic recording components 84c of the third sub-track Ts3 and the magnetization of each of the multiple fourth magnetic recording components 84d of the fourth sub-track Ts4.

For example, the one of the multiple third magnetic recording components 84c of the third sub-track Ts3 recited above included in the one of the multiple recording symbols recited above has a third magnetization. The one of the multiple fourth magnetic recording components 84d of the fourth sub-track Ts4 recited above included in the one of the multiple recording symbols recited above has a fourth magnetization.

At this time, the information that is recorded in the one other of the multiple recording symbols recited above is the first value when the third magnetization is in the first state St1 and the fourth magnetization is in the first state St1.

The information that is recorded in the one other of the multiple recording symbols recited above is the second value when the third magnetization is in the second state St2 and the fourth magnetization is in the second state St2.

The information that is recorded in the one other of the multiple recording symbols recited above is the third value when the third magnetization is in the first state St1 and the fourth magnetization is in the second state St2, or when the third magnetization is in the second state St2 and the fourth magnetization is in the first state St1.

In the embodiment, the following is performed. The number of continuous multiple third magnetic recording components 84c having the magnetizations in the same state is 4 or less in the third sub-track Ts3. The number of continuous multiple fourth magnetic recording components 84d having the magnetizations in the same state is 4 or less in the fourth sub-track Ts4. Thereby, the noise power ratio Rnp can be low. Thereby, for the second track Tr2 as well, stable magnetic recording and reproducing are possible.

In one recording symbol in the embodiment, the value may be "+1" when both of the two components are in the first state St1; and the value may be "−1" when both of the two components are in the second state St2. Conversely, for one recording symbol, the value may be "−1" when both of the two components are in the first state St1; and the value may be "+1" when both of the two components are in the second state St2. The two types of correspondences may be interchanged by units of multiple recording symbols. The control can be implemented by the controller 55.

In the embodiment, the state of the magnetization formed in the magnetic recording medium 80 is dependent on the information to be written. Therefore, there are cases where the number of continuous multiple magnetic recording components 84 having the magnetizations in the same state becomes large according to the information to be written. In such a case, the two types of correspondences recited above may be interchanged by units of multiple recording symbols. Thereby, the number of continuous multiple magnetic recording components 84 having the magnetizations in the same state can be reduced.

The configuration according to the second embodiment may be implemented in combination with the configuration according to the first embodiment. In other words, the number of continuous magnetic recording components 84 having the same state may be set to be 4 or less simultaneously with performing the modification of the states (interchanging the state S21 and the state S21) of the mutually-adjacent recording symbols (the first recording symbol Rb1 and the second recording symbol Rb2).

Figure 10:
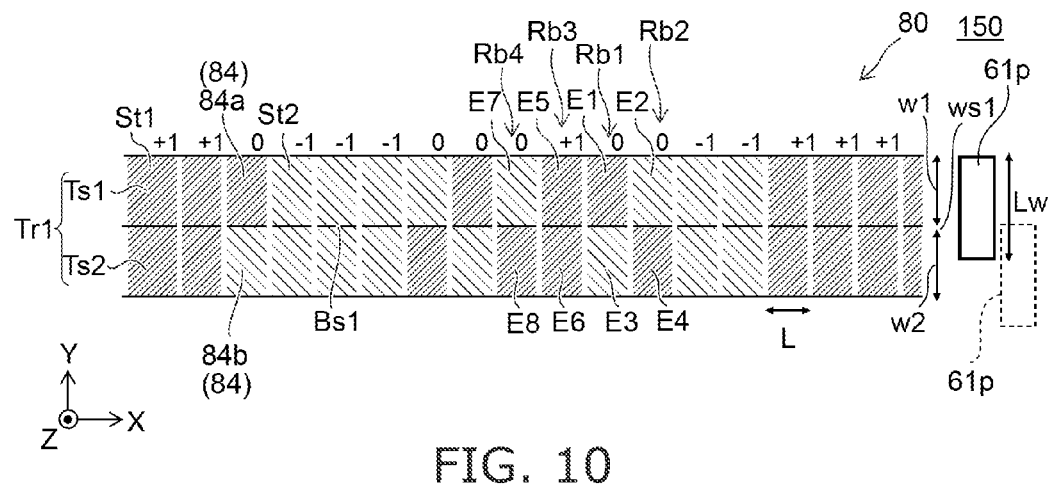
FIG. 10 is a schematic plan view showing the magnetic recording and reproducing device according to the embodiment.

FIG. 10 is a schematic plan view illustrating the magnetic recording and reproducing device according to the embodiment.

FIG. 10 shows an example of positions of the recording unit 60 in the writing operation.

In the first and second embodiments recited above in the example shown in FIG. 10, the recording of the information in the magnetic recording medium 80 is performed by shingled magnetic recording (SMR). In FIG. 10, the configuration of a portion 61p of the magnetic pole 61 included in the recording unit 60 opposing the magnetic recording medium 80 is schematically illustrated.

A length Lw in the second direction (the Y-axis direction) of the portion 61p of the magnetic pole 61 opposing the magnetic recording medium 80 is longer than the length (the first length w1) in the second direction of the first sub-track Ts1. The length Lw is longer than the length (the second length w2) in the second direction of the second sub-track Ts2. For example, the length Lw is not less than 1.2 times and not more than 2 times the first length w1. The length Lw is not less than 1.2 times and not more than 2 times the second length w2.

In the shingled magnetic recording, the recording is performed by shifting the relative position in the second direction (the Y-axis direction) between the recording unit 60 (the magnetic pole 61) and the magnetic recording medium 80. The amount (the length) of the shift is the length in the Y-axis direction of the sub-track. For example, the amount (the length) of the shift is ½ of the width of one track (the total of the first length w1, the second length w2, and the distance ws1).

For example, in a first recording, the relative position in the Y-axis direction of one end of the recording unit 60 (the magnetic pole 61) corresponds to the position in the Y-axis direction of one end of the first sub-track Ts1. Subsequently, the relative position in the Y-axis direction of the recording unit 60 (the magnetic pole 61) is shifted. In a second recording, the relative position in the Y-axis direction of the one end of the recording unit 60 (the magnetic pole 61) corresponds to the position in the Y-axis direction of one end of the second sub-track Ts2.

In the shingled magnetic recording, the recording of the information is performed multiply in one region of the magnetic recording medium 80. For example, the magnetization of at least a portion of the second sub-track Ts2 is changed when writing the first sub-track Ts1. Then, the magnetization of the second sub-track Ts2 is changed when writing the second sub-track Ts2.

Thus, the recording unit 60 may record the information in the first sub-track Ts1 and the second sub-track Ts2 by shingled magnetic recording. High density recording is possible by the shingled magnetic recording.

Third Embodiment

The embodiment relates to a magnetic recording and reproducing method. The method of the embodiment corresponds to the operation of the magnetic recording and reproducing device 150 described in the first embodiment.

The method includes the following.

In the method, information is written to the magnetic recording medium included in the first track Tr1. The first track Tr1 includes the first sub-track Ts1 that extends in the first direction, and the second sub-track Ts2 that extends in the first direction and is arranged with the first sub-track Ts1 in the second direction intersecting the first direction. The first sub-track Ts1 includes the multiple first magnetic recording components 84a. The second sub-track Ts2 includes the multiple second magnetic recording components 84b. When writing the information, the information is recorded in the first sub-track Ts1 and the second sub-track Ts2 by controlling the magnetization of each of the multiple first magnetic recording components 84a of the first sub-track Ts1 and the magnetization of each of the multiple second magnetic recording components 84b of the second sub-track Ts2.

The recorded information is reproduced by the reproducing unit 70 by, for example, sensing, along the first direction, the values corresponding to the magnetization of each of the multiple first magnetic recording components 84a of the first sub-track Ts1 and the magnetization of each of the multiple second magnetic recording components 84b of the second sub-track Ts2. The reproducing unit 70 opposes the first sub-track Ts1, the second sub-track Ts2, and the boundary Bs1 between the first sub-track Ts1 and the second sub-track Ts2.

The multiple first magnetic recording components 84a of the first sub-track Ts1 include the first component E1 and the second component E2, where the second component E2 is adjacent to the first component E1 in the first direction. The multiple second magnetic recording components 84b of the second sub-track Ts2 include the third component E3 that is adjacent to the first component E1 in the second direction, and the fourth component E4 that is adjacent to the third component E3 in the first direction and adjacent to the second component E2 in the second direction. The first recording symbol Rb1 is formed of the first component E1 and the third component E3. The second recording symbol Rb2 is formed of the second component E2 and the fourth component E4.

The magnetization of the first component E1 is set to the first state St1 and the magnetization of the third component E3 is set to the first state St1 when the information recorded in the first recording symbol Rb1 is the first value. The magnetization of the first component E1 is set to the second state St2 and the magnetization of the third component E3 is set to the second state St2 when the information recorded in the first recording symbol Rb1 is the second value. The magnetization of the first component E1 is set to the first state St1 and the magnetization of the third component E3 is set to the second state St2 when the information recorded in the first recording symbol Rb1 is the third value. The magnetization of the second component E2 is set to the second state St2 and the magnetization of the fourth component E4 is set to the first state SU when the information recorded in the second recording symbol Rb2 is the third value.

In other words, different states (one of the state S12 or the state S21) are used when writing the third value to each of two recording symbols adjacent to each other in the X-axis direction. Thereby, a magnetic recording and reproducing method in which stable magnetic recording and reproducing are possible can be provided.

Fourth Embodiment

The embodiment relates to a magnetic recording and reproducing method. The method of the embodiment corresponds to the operation of the magnetic recording and reproducing device 151 described in the second embodiment.

The method includes the following.

In the method, information is written to the magnetic recording medium 80 including the first track Tr1. The first track Tr1 includes the first sub-track Ts1 that extends in the first direction, and the second sub-track Ts2 that extends in the first direction and is arranged with the first sub-track Ts1 in the second direction intersecting the first direction. The first sub-track Ts1 includes the multiple first magnetic recording components 84a. The second sub-track Ts2 includes the multiple second magnetic recording components 84b. When writing the information, one of the multiple recording symbols arranged in the first direction is formed of one of the multiple first magnetic recording components 84a and one of the multiple second magnetic recording components 84b, where the one of the multiple second magnetic recording components 84b recited above is adjacent to the one of the multiple first magnetic recording components 84a recited above in the second direction. The information is recorded in the first sub-track Ts1 and the second sub-track Ts2 by controlling the magnetization of each of the multiple first magnetic recording components 84a of the first sub-track Ts1 and the magnetization of each of the multiple second magnetic recording components 84b of the second sub-track Ts2.

The reproducing unit 70 reproduces the information recorded in the first sub-track Ts1 and the second sub-track Ts2. The information that is recorded in the first sub-track Ts1 and the second sub-track Ts2 is reproduced by the reproducing unit 70 by, for example, sensing, along the first direction, the values corresponding to the magnetization of each of the multiple first magnetic recording components 84a of the first sub-track Ts1 and the magnetization of each of the multiple second magnetic recording components 84b of the second sub-track Ts2. The reproducing unit 70 opposes the first sub-track Ts1, the second sub-track Ts2, and the boundary Bs1 between the first sub-track Ts1 and the second sub-track Ts2.

The one of the multiple first magnetic recording components 84a recited above included in the one of the multiple recording symbols recited above has the first magnetization. The one of the multiple second magnetic recording components 84b recited above included in the one of the multiple recording symbols recited above has the second magnetization.

The first magnetization is set to the first state St1 and the second magnetization is set to the first state St1 when the information recorded in the one of the multiple recording symbols recited above is the first value. The first magnetization is set to the second state St2 and the second magnetization is set to the second state St2 when the information recorded in the one of the multiple recording symbols recited above is the second value. When the information recorded in the one of the multiple recording symbols recited above is the third value, the first magnetization is set to the first state St1 and the second magnetization is set to the second state St2, or the first magnetization is set to the second state St2 and the second magnetization is set to the first state St1.

The number of continuous multiple first magnetic recording components 84a having the magnetizations in the same state is 4 or less in the first sub-track Ts1. The number of continuous multiple second magnetic recording components 84b having the magnetizations in the same state is 4 or less in the second sub-track Ts2.

Thereby, the noise power ratio Rnp can be low. A magnetic recording and reproducing method in which stable magnetic recording and reproducing are possible can be provided.

An example of the configuration of the magnetic recording and reproducing device according to the embodiment will now be described. The magnetic recording and reproducing device 150 will now be described. The description also is applicable to the magnetic recording and reproducing device 151.

Figure 11:
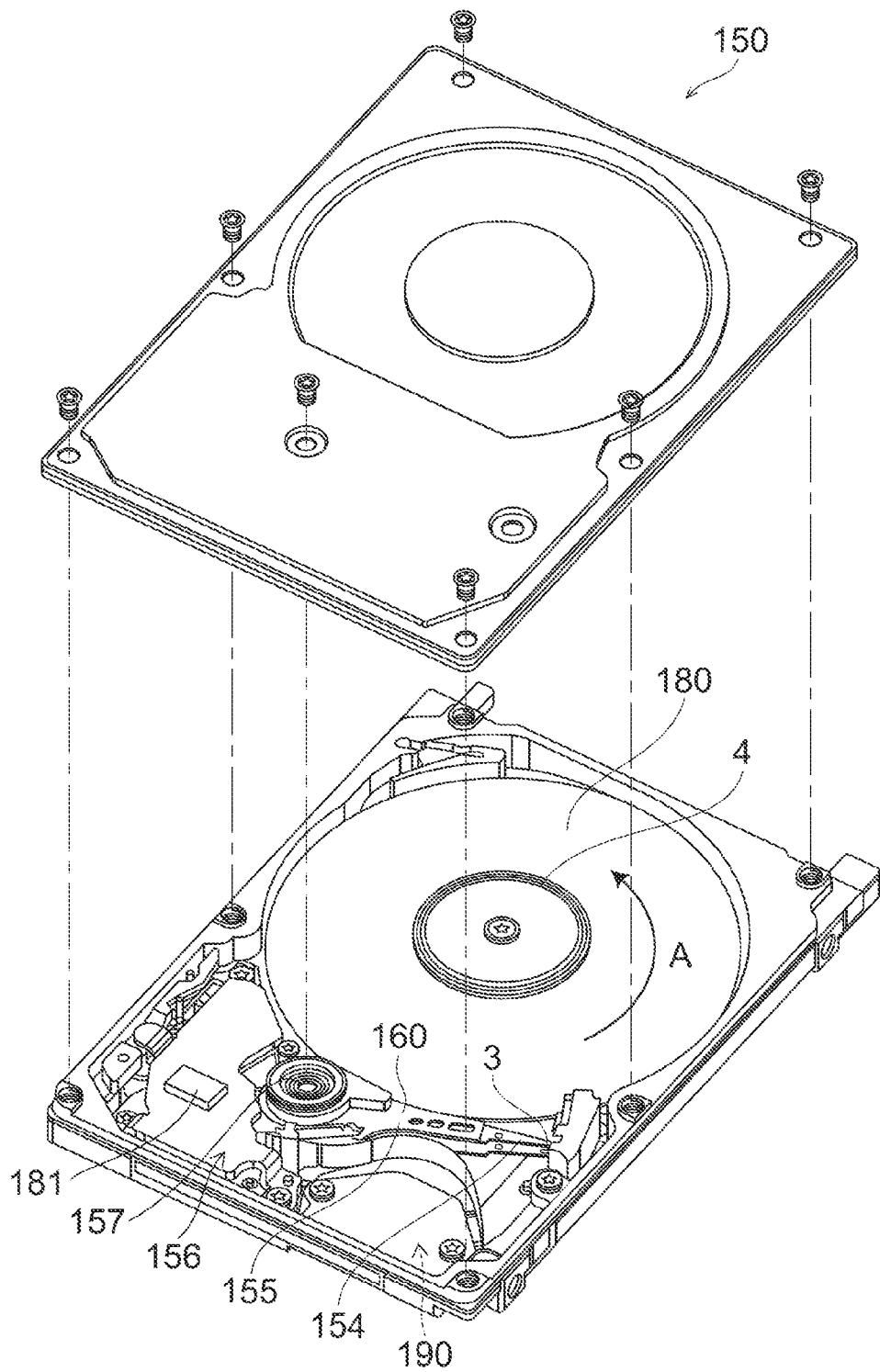
FIG. 11 is a schematic perspective view showing the magnetic recording and reproducing device according to the embodiment.

FIG. 11 is a schematic perspective view illustrating the magnetic recording and reproducing device according to the embodiment.

Figure 12A:
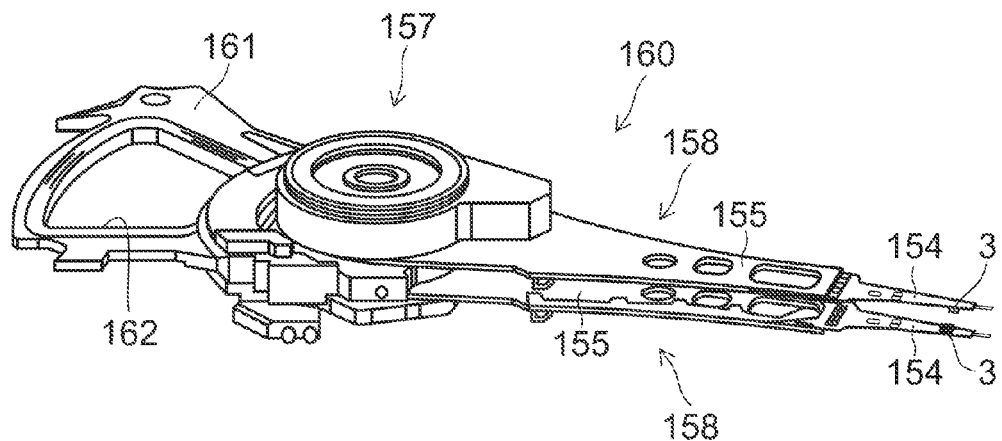
FIG. 12A and FIG. 12B are schematic perspective views showing portions of the magnetic recording and reproducing device according to the embodiment.
Figure 12B:
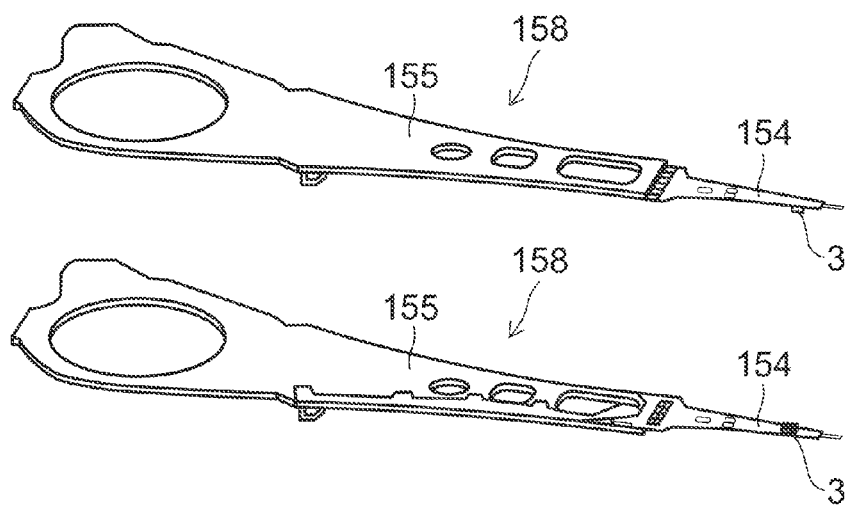

FIG. 12A and FIG. 12B are schematic perspective views illustrating portions of the magnetic recording and reproducing device according to the embodiment.

As shown in FIG. 11, the magnetic recording and reproducing device 150 according to the embodiment is a device that uses a rotary actuator. A recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

The head slider 3 that performs the recording/reproducing of the information stored in the recording medium disk 180 has a configuration such as that described above and is mounted to the tip of a suspension 154 having a thin-film configuration. Here, for example, one of the magnetic heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of an actuator arm 155 that includes a bobbin unit holding a drive coil, etc. A voice coil motor 156 which is one type of linear motor is provided at one other end of the actuator arm 155. The voice coil motor 156 may include a drive coil that is wound onto the bobbin unit of the actuator arm 155, and a magnetic circuit made of a permanent magnet and an opposing yoke that are disposed to oppose each other with the coil interposed. The suspension 154 has one end and one other end; the magnetic head is mounted to the one end of the suspension 154; and the actuator arm 155 is connected to the one other end of the suspension 154.

The actuator arm 155 is held by ball bearings provided at two locations on and under a bearing unit 157; and the actuator arm 155 can be caused to rotate and slide unrestrictedly by the voice coil motor 156. As a result, the magnetic head is movable to any position of the recording medium disk 180.

FIG. 12A illustrates the configuration of a portion of the magnetic recording and reproducing device and is an enlarged perspective view of a head stack assembly 160.

FIG. 12B is a perspective view illustrating a magnetic head assembly (a head gimbal assembly (HGA)) 158 which is a portion of the head stack assembly 160.

As shown in FIG. 12A, the head stack assembly 160 includes the bearing unit 157, the head gimbal assembly 158 that extends from the bearing unit 157, and a support frame 161 that extends from the bearing unit 157 in the opposite direction of the HGA and supports a coil 162 of the voice coil motor.

As shown in FIG. 12B, the head gimbal assembly 158 includes the actuator arm 155 that extends from the bearing unit 157, and the suspension 154 that extends from the actuator arm 155.

The head slider 3 is mounted to the tip of the suspension 154. One of the magnetic heads according to the embodiments is mounted to the head slider 3.

In other words, the magnetic head assembly (the head gimbal assembly) 158 according to the embodiment includes the magnetic head according to the embodiment, the head slider 3 to which the magnetic head is mounted, the suspension 154 that has the head slider 3 mounted to one end of the suspension 154, and the actuator arm 155 that is connected to the other end of the suspension 154.

The suspension 154 includes, for example, lead wires (not shown) that are for writing and reproducing signals, for a heater that adjusts the fly height, for a spin torque oscillator, etc. The lead wires are electrically connected to electrodes of the magnetic head embedded in the head slider 3.

A signal processor 190 is provided to write and reproduce the signals to and from the magnetic recording medium by using the magnetic head. For example, the signal processor 190 is provided on the backside of the drawing of the magnetic recording and reproducing device 150 illustrated in FIG. 11. The input/output lines of the signal processor 190 are electrically connected to the magnetic head by being connected to electrode pads of the head gimbal assembly 158.

Thus, the magnetic recording and reproducing device 150 according to the embodiment includes a magnetic recording medium, the magnetic head according to the embodiment recited above, a movable unit that is relatively movable in a state in which the magnetic recording medium and the magnetic head are separated from each other or in contact with each other, a position controller that aligns the magnetic head at a prescribed recording position of the magnetic recording medium, and a signal processor that writes and reproduces signals to and from the magnetic recording medium by using the magnetic head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes the magnetic recording medium, the magnetic head assembly according to the embodiment, and the signal processor that writes and reproduces signals to and from the magnetic recording medium by using the magnetic head mounted to the magnetic head assembly.

According to the embodiments, a magnetic recording and reproducing device and a magnetic recording and reproducing method in which stable magnetic recording and reproducing are possible are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording and reproducing devices such as magnetic recording media, recording units, reproducing units, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording and reproducing devices and magnetic recording and reproducing methods practicable by an appropriate design modification by one skilled in the art based on the magnetic recording and reproducing devices and magnetic recording and reproducing methods described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:
    a magnetic recording medium including a first track including
        a first sub-track extending in a first direction, and
        a second sub-track extending in the first direction, the second sub-track being arranged with the first sub-track in a second direction intersecting the first direction;
    a recording unit recording information in the first sub-track and the second sub-track; and
    a reproducing unit reproducing the information recorded in the first sub-track and the second sub-track while opposing the first sub-track, the second sub-track, and a boundary between the first sub-track and the second sub-track,
    the first sub-track including a plurality of first magnetic recording components, the first magnetic recording components including a first component and a second component, the second component being adjacent to the first component in the first direction,
    the second sub-track including a plurality of second magnetic recording components, the second magnetic recording components including a third component and a fourth component, the third component being adjacent to the first component in the second direction, the fourth component being adjacent to the third component in the first direction and adjacent to the second component in the second direction,
    a first recording symbol being formed of the first component and the third component,
    a second recording symbol being formed of the second component and the fourth component,
    the information recorded in the first recording symbol being a first value when a magnetization of the first component is in a first state and a magnetization of the third component is in the first state,
    the information recorded in the first recording symbol being a second value when the magnetization of the first component is in a second state and the magnetization of the third component is in the second state,
    the information recorded in the first recording symbol being a third value when the magnetization of the first component is in the first state and the magnetization of the third component is in the second state,
    the information recorded in the second recording symbol being the third value when a magnetization of the second component is in the second state and a magnetization of the fourth component is in the first state.

2. The device according to claim 1, wherein
the information recorded in the second recording symbol is the first value when the magnetization of the second component is in the first state and the magnetization of the fourth component is in the first state, and
the information recorded in the second recording symbol is the second value when the magnetization of the second component is in the second state and the magnetization of the fourth component is in the second state.

3. The device according to claim 1, wherein the information recorded in the first recording symbol is the third value when the magnetization of the first component is in the second state and the magnetization of the third component is in the first state.

4. The device according to claim 1, wherein
the first sub-track further includes a fifth component, the first component being provided between the fifth component and the second component, the first component being adjacent to the fifth component in the first direction,
the second sub-track further includes a sixth component adjacent to the fifth component in the second direction, the third component being adjacent to the sixth component in the first direction,
a third recording symbol is formed of the fifth component and the sixth component, and
the information recorded in the third recording symbol is the first value when a magnetization of the fifth component is in the first state and a magnetization of the sixth component is in the first state.

5. The device according to claim 4, wherein
the first sub-track further includes a seventh component, the fifth component being provided between the seventh component and the first component, the fifth component being adjacent to the seventh component in the first direction,
the second sub-track further includes an eighth component adjacent to the seventh component in the second direction, the sixth component being adjacent to the eighth component in the first direction,
a fourth recording symbol is formed of the seventh component and the eighth component, and
the information recorded in the fourth recording symbol is the third value when a magnetization of the seventh component is in the second state and a magnetization of the eighth component is in the first state.

6. The device according to claim 1, wherein
the magnetic recording medium further includes a second track including:
    a third sub-track extending in the first direction, the third sub-track being arranged with the second sub-track in the second direction; and
    a fourth sub-track extending in the first direction, the fourth sub-track being arranged with the third sub-track in the second direction,
the second sub-track is disposed between the first sub-track and the fourth sub-track,
the third sub-track is disposed between the second sub-track and the fourth sub-track,
a distance between the second sub-track and the third sub-track is longer than a distance between the first sub-track and the second sub-track and longer than a distance between the third sub-track and the fourth sub-track,
the recording unit records information in the third sub-track and the fourth sub-track, and
the reproducing unit reproduces the information recorded in the third sub-track and the fourth sub-track while opposing the third sub-track, the fourth sub-track, and a boundary between the third sub-track and the fourth sub-track.

7. The device according to claim 6, wherein
the third sub-track includes a plurality of third magnetic recording components, the third magnetic recording components including a ninth component and a tenth component, the tenth component being adjacent to the ninth component in the first direction,
the fourth sub-track includes a plurality of fourth magnetic recording components, the fourth magnetic recording components including an eleventh component and a twelfth component, the eleventh component being adjacent to the ninth component in the second direction, the twelfth component being adjacent to the eleventh component in the first direction and adjacent to the tenth component in the second direction,
a fifth recording symbol is formed of the ninth component and the eleventh component,
a sixth recording symbol is formed of the tenth component and the twelfth component,
the information recorded in the fifth recording symbol is the first value when a magnetization of the ninth component is in the first state and a magnetization of the eleventh component is in the first state,
the information recorded in the fifth recording symbol is the second value when the magnetization of the ninth component is in the second state and the magnetization of the eleventh component is in the second state,
the information recorded in the fifth recording symbol is the third value when the magnetization of the ninth component is in the first state and the magnetization of the eleventh component is in the second state, and
the information recorded in the sixth recording symbol is the third value when a magnetization of the tenth component is in the second state and a magnetization of the twelfth component is in the first state.

8. The device according to claim 7, wherein
the information recorded in the sixth recording symbol is the first value when the magnetization of the tenth component is in the first state and the magnetization of the twelfth component is in the first state, and
the information recorded in the sixth recording symbol is the second value when the magnetization of the tenth component is in the second state and the magnetization of the twelfth component is in the second state.

9. The device according to claim 7, wherein the information recorded in the fifth recording symbol is the third value when the magnetization of the ninth component is in the second state and the magnetization of the eleventh component is in the first state.

10. The device according to claim 1, further comprising a controller controlling the recording unit,
one of a plurality of recording symbols arranged in the first direction being formed of one of the first magnetic recording components and one of the second magnetic recording components, the one of the second magnetic recording components being adjacent to the one of the first magnetic recording components in the second direction,
the controller setting, when the recording unit records the third value in the one of the recording symbols, a magnetization of the one of the first magnetic recording components included in the one of the recording symbols to the first state or the second state to reduce a number of continuous magnetic recording components of the first magnetic recording components in the first sub-track having the magnetizations in a same state.

11. The device according to claim 1, wherein
the one of the first magnetic recording components included in the one of the recording symbols has the first magnetization, and the one of the second magnetic recording components included in the one of the recording symbols has the second magnetization,
the information recorded in the one of the recording symbols is a first value when the first magnetization is in a first state and the second magnetization is in the first state,
the information recorded in the one of the recording symbols is a second value when the first magnetization is in a second state and the second magnetization is in the second state,
the information recorded in the one of the recording symbols is a third value when the first magnetization is in the first state and the second magnetization is in the second state, or when the first magnetization is in the second state and the second magnetization is in the first state,
a number of continuous magnetic recording components of the first magnetic recording components having the magnetizations in a same state is 4 or less in the first sub-track, and
a number of continuous magnetic recording components of the second magnetic recording components having the magnetizations in a same state is 4 or less in the second sub-track.

12. A magnetic recording and reproducing device, comprising:
a magnetic recording medium including a first track including
a first sub-track extending in a first direction, and
a second sub-track extending in the first direction, the second sub-track being arranged with the first sub-track in a second direction intersecting the first direction;
a recording unit recording information in the first sub-track and the second sub-track, and
a reproducing unit reproducing the information recorded in the first sub-track and the second sub-track while opposing the first sub-track, the second sub-track, and a boundary between the first sub-track and the second sub-track,
the first sub-track including a plurality of first magnetic recording components,
the second sub-track including a plurality of second magnetic recording components,
one of a plurality of recording symbols arranged in the first direction being formed of one of the first magnetic recording components and one of the second magnetic recording components, the one of the second magnetic recording components being adjacent to the one of the first magnetic recording components in the second direction,
the one of the first magnetic recording components included in the one of the recording symbols having a first magnetization, and the one of the second magnetic recording components included in the one of the recording symbols having a second magnetization,
the information recorded in the one of the recording symbols being a first value when the first magnetization is in a first state and the second magnetization is in the first state,
the information recorded in the one of the recording symbols being a second value when the first magnetization is in a second state and the second magnetization is in the second state, the information recorded in the one of the recording symbols being a third value when the first magnetization is in the first state and the second magnetization is in the second state, or when the first magnetization is in the second state and the second magnetization is in the first state, a number of continuous magnetic recording components of the first magnetic recording components having the magnetizations in a same state being 4 or less in the first sub-track, a number of continuous magnetic recording components of the second magnetic recording components having the magnetizations in a same state being 4 or less in the second sub-track.

13. The device according to claim 12, wherein the magnetic recording medium further includes a second track including:
- a third sub-track extending in the first direction and including a plurality of third magnetic recording components, the third sub-track being arranged with the second sub-track in the second direction; and
- a fourth sub-track extending in the first direction and including a plurality of fourth magnetic recording components, the fourth sub-track being arranged with the third sub-track in the second direction, the second sub-track is disposed between the first sub-track and the fourth sub-track, the third sub-track is disposed between the second sub-track and the fourth sub-track, one other of the recording symbols arranged in the first direction is formed of one of the third magnetic recording components and one of the fourth magnetic recording components, the one of the fourth magnetic recording components being adjacent to the one of the third magnetic recording components in the second direction, a distance between the second sub-track and the third sub-track is longer than a distance between the first sub-track and the second sub-track and longer than a distance between the third sub-track and the fourth sub-track, the recording unit records information in the third sub-track and the fourth sub-track, and the reproducing unit reproduces the information recorded in the third sub-track and the fourth sub-track while opposing the third sub-track, the fourth sub-track, and a boundary between the third sub-track and the fourth sub-track.

14. The device according to claim 13, wherein the one of the third magnetic recording components included in the one other of the recording symbols has a third magnetization, and the one of the fourth magnetic recording components included in the one other of the recording symbols has a fourth magnetization, the information recorded in the one other of the recording symbols is the first value when the third magnetization is in the first state and the fourth magnetization is in the first state, the information recorded in the one other of the recording symbols is the second value when the third magnetization is in the second state and the fourth magnetization is in the second state, the information recorded in the one other of the recording symbols is the third value when the third magnetization is in the first state and the fourth magnetization is in the second state, or when the third magnetization is in the second state and the fourth magnetization is in the first state, a number of continuous magnetic recording components of the third magnetic recording components having the magnetizations in a same state is 4 or less in the third sub-track, and a number of continuous magnetic recording components of the fourth magnetic recording components having the magnetizations in a same state is 4 or less in the fourth sub-track.

15. The device according to claim 1, wherein the recording unit records the information in the first sub-track and the second sub-track by shingled magnetic recording.

16. The device according to claim 1, wherein a length in the second direction of the first sub-track is not less than 5 nanometers and not more than 40 nanometers, and a length in the second direction of the second sub-track is not less than 5 nanometers and not more than 40 nanometers.

17. The device according to claim 1, wherein a spacing between the first sub-track and the second sub-track is not more than 1/10 of a length in the second direction of the first sub-track and not more than 1/10 of a length in the second direction of the second sub-track.

18. The device according to claim 1, wherein a length in the first direction of each of the first magnetic recording components is not less than 5 nanometers and not more than 20 nanometers.

19. A magnetic recording and reproducing method, comprising:
recording information in a first sub-track and a second sub-track, the first sub-track and the second sub-track being included in a first track included in a magnetic recording medium, the first sub-track extending in a first direction, the second sub-track extending in the first direction and being arranged with the first sub-track in a second direction intersecting the first direction; and reproducing the information recorded in the first sub-track and the second sub-track, the reproducing being performed by a reproducing unit, the reproducing unit opposing the first sub-track, the second sub-track, and a boundary between the first sub-track and the second sub-track;

a plurality of first magnetic recording components included in the first sub-track including a first component and a second component, the second component being adjacent to the first component in the first direction, a plurality of second magnetic recording components included in the second sub-track including a third component and a fourth component, the third component being adjacent to the first component in the second direction, the fourth component being adjacent to the third component in the first direction and adjacent to the second component in the second direction, a first recording symbol being formed of the first component and the third component, a second recording symbol being formed of the second component and the fourth component, a magnetization of the first component being set to a first state and a magnetization of the third component being set to the first state when the information recorded in the first recording symbol is a first value, the magnetization of the first component being set to a second state and the magnetization of the third component being set to the second state when the information recorded in the first recording symbol is a second value, the magnetization of the first component being set to the first state and the magnetization of the third component being set to the second state when the information recorded in the first recording symbol is a third value, a magnetization of the second component being set to the second state and a magnetization of the fourth component being set to the first state when the information recorded in the second recording symbol is the third value.

20. A magnetic recording and reproducing method, comprising:

recording information in a first sub-track and a second sub-track, the first sub-track and the second sub-track being included in a first track included in a magnetic recording medium, the first sub-track extending in a first direction, the second sub-track extending in the first direction and being arranged with the first sub-track in a second direction intersecting the first direction; and reproducing the information recorded in the first sub-track and the second sub-track, the reproducing being performed by a reproducing unit, the reproducing unit opposing the first sub-track, the second sub-track, and a boundary between the first sub-track and the second sub-track, the first sub-track including a plurality of first magnetic recording components, the second sub-track including a plurality of second magnetic recording components, one of a plurality of recording symbols arranged in the first direction being formed of one of the first magnetic recording components and one of the second magnetic recording components, the one of the second magnetic recording components being adjacent to the one of the first magnetic recording components in the second direction, the one of the first magnetic recording components included in the one of the recording symbols having a first magnetization, and the one of the second magnetic recording components included in the one of the recording symbols having a second magnetization, the first magnetization being set to a first state and the second magnetization being set to the first state when the information recorded in the one of the recording symbols is a first value, the first magnetization being set to a second state and the second magnetization being set to the second state when the information recorded in the one of the recording symbols is a second value, when the information recorded in the one of the recording symbols is a third value, the second magnetization being set to the second state while setting the first magnetization to the first state, or the second magnetization being set to the first state while setting the first magnetization to the second state, a number of continuous magnetic recording components of the first magnetic recording components having the magnetizations in a same state being 4 or less in the first sub-track, a number of continuous magnetic recording components of the second magnetic recording components having the magnetizations in a same state being 4 or less in the second sub-track.

* * * * *